US010007351B2

(12) United States Patent
Nagai et al.

(10) Patent No.: US 10,007,351 B2
(45) Date of Patent: Jun. 26, 2018

(54) THREE-DIMENSIONAL USER INTERFACE DEVICE AND THREE-DIMENSIONAL OPERATION PROCESSING METHOD

(71) Applicant: NEC Solution Innovators, Ltd., Tokyo (JP)

(72) Inventors: Katsuyuki Nagai, Tokyo (JP); Hisashi Noda, Tokyo (JP); Koji Morishita, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 153 days.

(21) Appl. No.: 14/773,567

(22) PCT Filed: Sep. 6, 2013

(86) PCT No.: PCT/JP2013/074118
§ 371 (c)(1),
(2) Date: Sep. 8, 2015

(87) PCT Pub. No.: WO2014/141504
PCT Pub. Date: Sep. 18, 2014

(65) Prior Publication Data
US 2016/0018897 A1 Jan. 21, 2016

(30) Foreign Application Priority Data
Mar. 11, 2013 (JP) .................................. 2013-047849

(51) Int. Cl.
*G09G 5/00* (2006.01)
*G06F 3/01* (2006.01)
(Continued)

(52) U.S. Cl.
CPC ........... *G06F 3/017* (2013.01); *G02B 27/017* (2013.01); *G06F 3/012* (2013.01); *G06F 3/013* (2013.01);
(Continued)

(58) Field of Classification Search
CPC . G06F 3/01; G06F 3/011; G06F 3/012; G06F 3/013; G06F 3/017; G06F 3/04812;
(Continued)

(56) References Cited

U.S. PATENT DOCUMENTS 6,346,929 B1  2/2002 Fukushima
6,771,294 B1  8/2004 Pulli et al.
(Continued)

FOREIGN PATENT DOCUMENTS

CN   1529875 A   9/2004
CN   102542160 A   7/2012
(Continued)

OTHER PUBLICATIONS

Japanese Official Action—2015-505219—May 10, 2016.
(Continued)

*Primary Examiner* — Jason Mandeville
(74) *Attorney, Agent, or Firm* — Young & Thompson

(57) ABSTRACT

A three-dimensional user interface device includes a coordinate setting unit setting a three-dimensional coordinate space (3DCS) on the basis of a line-of-sight image, a virtual data generation unit generating three-dimensional area data representing a transparent virtual three-dimensional operation area (V3DOA) arranged in an arbitrary position in the 3DCS in a state in which at least a boundary of the area is visible, a display processing unit displaying a V3DOA represented by the generated three-dimensional area data by using a visible space in the 3DCS corresponding to a space shown on the line-of-sight image as a display reference, and an operation detection unit detecting an operation performed by the operator with the specific region in the V3DOA on the basis of the three-dimensional position acquired with respect to the specific region of the operator in the 3DCS and a position of the V3DOA in the 3DCS.

13 Claims, 17 Drawing Sheets

(51) Int. Cl.
*G06F 3/0481* (2013.01)
*G02B 27/01* (2006.01)
*G06F 3/0484* (2013.01)

(52) U.S. Cl.
CPC ...... *G06F 3/04815* (2013.01); *G06F 3/04847* (2013.01); *G02B 2027/014* (2013.01); *G02B 2027/0134* (2013.01); *G02B 2027/0138* (2013.01); *G02B 2027/0178* (2013.01); *G02B 2027/0187* (2013.01)

(58) Field of Classification Search
CPC ............... G06F 3/04815; G06F 3/0482; G06F 3/04847; G02B 27/01; G02B 27/017; G02B 27/0179; G02B 2027/014; G02B 2027/0134; G02B 2027/0138; G02B 2027/0178; G02B 2027/0187
USPC .......................................... 345/156, 157, 7, 8
See application file for complete search history.

(56) References Cited

U.S. PATENT DOCUMENTS

| | | | |
|---|---|---|---|
| 8,094,120 B2 | 1/2012 | Ratai | |
| 8,228,315 B1 | 7/2012 | Starner et al. | |
| 8,693,724 B2* | 4/2014 | Ahmed | G06F 3/017 345/156 |
| 8,854,433 B1* | 10/2014 | Rafii | G06F 3/017 348/42 |
| 9,110,557 B2* | 8/2015 | Tresser | G06F 3/011 |
| 9,396,578 B2 | 7/2016 | Shefi | |
| 9,489,053 B2 | 11/2016 | Latta | |
| 2002/0041327 A1 | 4/2002 | Hildreth et al. | |
| 2004/0095311 A1 | 5/2004 | Tarlton et al. | |
| 2008/0231926 A1 | 9/2008 | Klug | |
| 2009/0187389 A1 | 7/2009 | Dobbins et al. | |
| 2011/0029903 A1 | 2/2011 | Schooleman et al. | |
| 2011/0140994 A1 | 6/2011 | Noma | |
| 2011/0213664 A1 | 9/2011 | Osterhout et al. | |
| 2011/0260967 A1 | 10/2011 | Matsushima | |
| 2011/0310100 A1* | 12/2011 | Adimatyam | G06F 3/017 345/420 |
| 2013/0222233 A1* | 8/2013 | Park | G06F 3/03 345/156 |
| 2013/0342570 A1* | 12/2013 | Kinnebrew | G09G 3/003 345/633 |

FOREIGN PATENT DOCUMENTS

| | | |
|---|---|---|
| EP | 0679984 A1 | 11/1995 |
| EP | 2506222 A2 | 10/2012 |
| JP | 08-006708 | 1/1996 |
| JP | 2005-301668 | 10/2005 |
| JP | 2006-506737 | 2/2006 |
| JP | 2008-500624 | 1/2008 |
| JP | 2009-251154 | 10/2009 |
| JP | 2010-164814 | 7/2010 |
| JP | 2010-218405 | 9/2010 |
| JP | 2011081506 | 4/2011 |
| JP | 2011-128220 | 6/2011 |
| JP | 2011-521318 | 7/2011 |
| JP | 2011-175405 | 9/2011 |
| JP | 2011-243031 | 12/2011 |
| WO | 2008115997 A2 | 9/2008 |
| WO | 2010/073928 | 7/2010 |

OTHER PUBLICATIONS

International Search Report, PCT/JP2013/074118, dated Dec. 10, 2013.
Chinese Office Action Application No. 201380074605.9; dated May 27, 2017.
Poster: Physically-based Natural Hand and Tangible AR Interaction for face-to-face Collaboration on a Tabletop; Thammathip Piumsomboon, etc.; The HIT Lab NZ, University of Canterbury,Christchurch, New Zealand; this paper appears in: 3D User Interface (3DUI); 2012 IEEE Symposium on Issue Date Mar. 4-5, 2012 Written by Piumsomboon T., et al.
You Tube: Smart Vision-Sap Hana + Augumented Reality + Microsoft Kinect; Published on Mar. 30, 2012; pp. 1-4.

\* cited by examiner

THREE-DIMENSIONAL USER INTERFACE DEVICE AND THREE-DIMENSIONAL OPERATION PROCESSING METHOD

TECHNICAL FIELD

The present invention relates to a three-dimensional user interface technology.

BACKGROUND ART

Recently, a user interface which detects a gesture of a user by using a distance sensor such as KINECT (registered trademark), a WEB camera, and the like, and controls a device according to the detected gesture has been spread.

In a gesture operation, unlike a button operation, a touch operation with respect to a touch panel, and the like, there is no sense of the operation and a few limitations with respect to an operation space. Accordingly, in the user interface using the gesture, a virtual operation area is set, and an operation start and an operation end of an operator is determined by this virtual operation area.

In Patent Document 1 described below, a method is proposed in which a hand of a user is recognized, an operation area which has no view and is able to be operated by the user is set in the vicinity of the recognized hand, and the position of the operation area is moved according to the movement of the hand. In addition, in Patent Document 2 described below, a method is proposed in which an operation region of each of plural operators is recognized, a range of movement of each of the operation regions is calculated for each operator, and a gesture recognition range is set for each of the operators on the basis of each of the ranges of movement excluding overlap. In Patent Document 3 described below, a method is proposed in which an operable range of an operator which is changed according to a positional relationship between an image capturing device and the operator, a position of a barrier, and the like is displayed.

RELATED DOCUMENT

Patent Document

[Patent Document 1] Japanese Laid-open Patent Publication No. 2011-81506

[Patent Document 2] Japanese Laid-open Patent Publication No. 2011-243031

[Patent Document 3] Japanese Laid-open Patent Publication No. 2011-175405

SUMMARY OF THE INVENTION

Problem to be Solved by the Invention

The operator or a provider of the user interface may desire to arrange the operation area in a desired size or a desired position, or in a desired number according to usability of each individual, accuracy of gesture recognition processing, an operation target in the gesture operation, and the like. For this reason, when the operation area is not able to be freely set, it may be difficult to realize a user-friendly user interface using the gesture operation.

In each of the proposed methods described above, the operation area for detecting the gesture operation is not able to be freely set. For example, the methods proposed in Patent Documents 1 and 2 automatically set the range of movement of the operation region of the operator in the operation area. These proposed methods do not display the operation area based on considerations that the operator has no need to recognize the operation area by such automatic setting. However, in such a method, the operation area follows the operation region of the operator, and thus a gesture operation which is not intended by the operator is recognized, and as a result thereof, an erroneous operation easily occurs. On the other hand, the method proposed in Patent Document 3 displays the operation area, but automatically sets the operation area (the operable range) according to the position of the user or the position of the barrier. Accordingly, in this proposed method, the operation area is not able to be freely set.

The present invention is made in consideration of such a situation as described above, and provides a technology improving the usability of a user interface using a gesture operation by enabling a stereoscopic operation area for detecting the gesture operation of an operator to be freely set.

Means for Solving the Problem

In each aspect of the present invention, each of the following configurations is adopted in order to solve the problems described above.

A three-dimensional user interface device according to a first aspect includes: a line-of-sight image acquisition unit that acquires a line-of-sight image from an operator, the image being captured by an image capturing unit mounted on a head of the operator; a coordinate setting unit that sets a three-dimensional coordinate space on the basis of the line-of-sight image which is acquired by the line-of-sight image acquisition unit; a virtual data generation unit that generates three-dimensional area data representing a transparent virtual three-dimensional operation area arranged in an arbitrary position in the three-dimensional coordinate space in a state in which at least a boundary of the area is visible; a display processing unit that causes a display unit mounted on the head of the operator to display the virtual three-dimensional operation area represented by the three-dimensional area data which is generated by the virtual data generation unit by using a visible space in the three-dimensional coordinate space corresponding to a space shown on the line-of-sight image as a display reference; a position acquisition unit that acquires a three-dimensional position of a specific region of the operator in the three-dimensional coordinate space; and an operation detection unit that detects an operation performed by the operator with the specific region in the virtual three-dimensional operation area on the basis of the three-dimensional position which is acquired by the position acquisition unit and a position of the virtual three-dimensional operation area in the three-dimensional coordinate space.

A three-dimensional operation processing method according to a second aspect is executed by at least one computer. The three-dimensional operation processing method according to the second aspect includes: acquiring a line-of-sight image from an operator, the image being captured by an image capturing unit mounted on a head of the operator; setting a three-dimensional coordinate space on the basis of the acquired line-of-sight image; generating three-dimensional area data representing a transparent virtual three-dimensional operation area arranged in an arbitrary position in the three-dimensional coordinate space in a state in which at least a boundary of the area is visible; causing a display unit mounted on the head of the operator to display the virtual three-dimensional operation area represented by the generated three-dimensional area data by using a visible space in the three-dimensional coordinate space corresponding to a space shown on the line-of-sight image as a display reference; acquiring a three-dimensional position of a specific region of the operator in the three-dimensional coordinate space; and detecting an operation performed by the operator with the specific region in the virtual three-dimensional operation area on the basis of the acquired three-dimensional position and a position of the virtual three-dimensional operation area in the three-dimensional coordinate space.

Furthermore, another aspect of the present invention may be a program which allows at least one computer to execute the method of the second aspect described above, or may be a computer-readable recording medium in which such a program is recorded. This recording medium includes a non-transitory medium.

Effect of the Invention

According to the aspect described above, it is possible to provide a technology in which a stereoscopic operation area for detecting the gesture operation of the user is able to be freely set, and the usability of the user interface using the gesture operation is improved.

BRIEF DESCRIPTION OF THE DRAWINGS

The above-described object and other objects of the present invention, and features and advantages of the present invention will be made further clear by the preferred embodiment described below and the following drawings attached thereto.

DESCRIPTION OF EMBODIMENTS

Hereinafter, exemplary embodiments of the present invention will be described. Furthermore, the following exemplary embodiments are examples, and the present invention is not limited to the configuration of the following exemplary embodiments.

Figure 1:
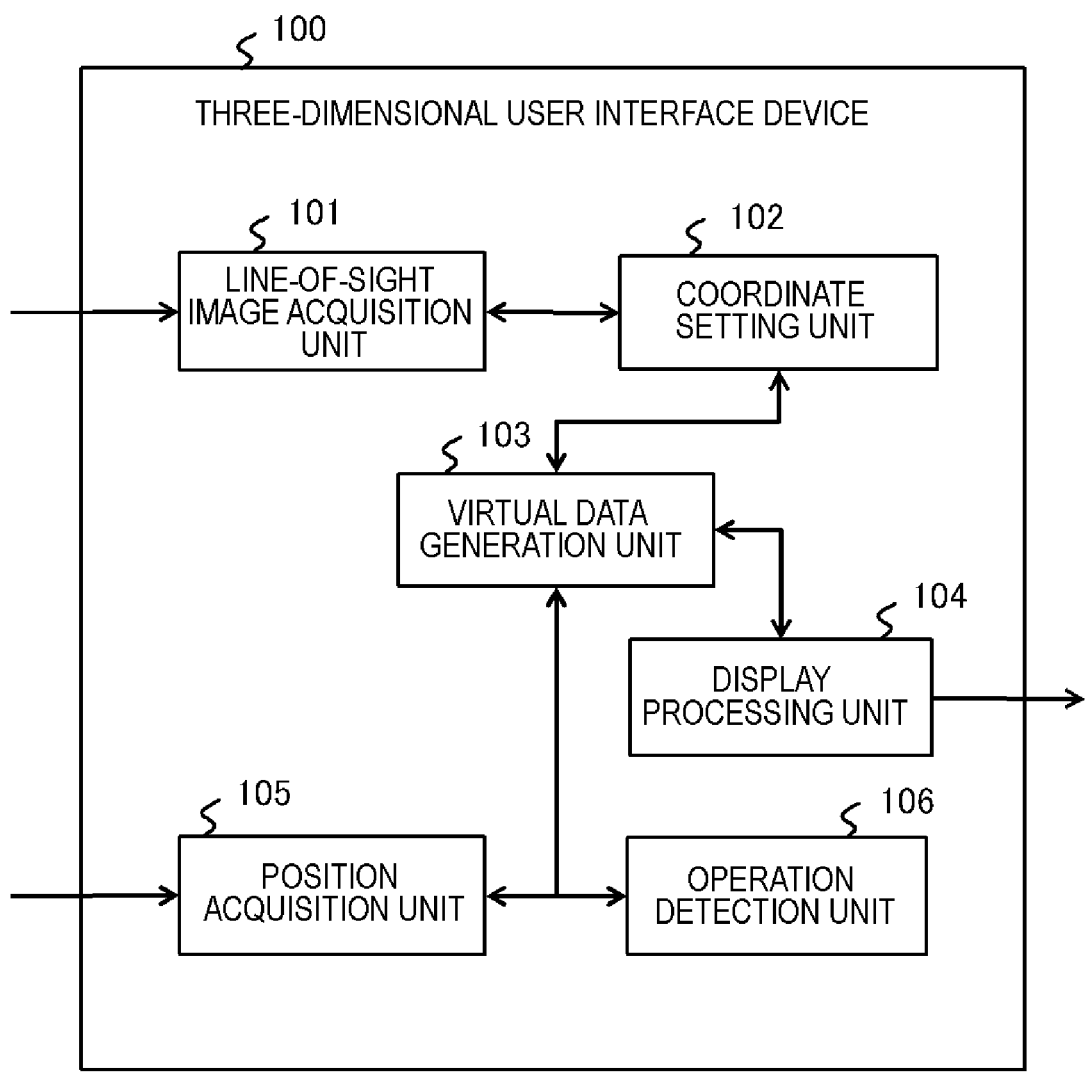
FIG. 1 is a diagram conceptually illustrating a configuration example of a three-dimensional user interface device according to an exemplary embodiment of the present invention.

FIG. 1 is a diagram conceptually illustrating a configuration example of a three-dimensional user interface device 100 according to an exemplary embodiment of the present invention. As illustrated in FIG. 1, the three-dimensional user interface device 100 includes a line-of-sight image acquisition unit 101 that acquires a line-of-sight image from an operator which is captured by an image capturing unit mounted on the head of the operator, a coordinate setting unit 102 that sets a three-dimensional coordinate space on the basis of the line-of-sight image which is acquired by the line-of-sight image acquisition unit 101, a virtual data generation unit 103 that generates three-dimensional area data representing a transparent virtual three-dimensional operation area arranged in an arbitrary position in the three-dimensional coordinate space in a state in which at least a boundary of the area is visible, a display processing unit 104 that causes a display unit mounted on the head of the operator to display the virtual three-dimensional operation area represented by the three-dimensional area data which is generated by the virtual data generation unit 103 by using visible space in the three-dimensional coordinate space corresponding to a space shown on the line-of-sight image as a display reference, a position acquisition unit 105 that acquires a three-dimensional position of a specific region of the operator in the three-dimensional coordinate space, and an operation detection unit 106 that detects an operation performed by the operator with the specific region in the virtual three-dimensional operation area on the basis of the three-dimensional position which is acquired by the position acquisition unit 105 and a position of the virtual three-dimensional operation area in the three-dimensional coordinate space.

The three-dimensional user interface device 100 illustrated in FIG. 1, for example, has the same hardware configuration as that of a three-dimensional user interface system 1 according to each of exemplary embodiments described below in detail, and as with the three-dimensional user interface system 1, each unit described above is realized by processing a program. The image capturing unit and the display unit which are mounted on the head of the operator are connected to the three-dimensional user interface device 100 to communicate therewith.

A three-dimensional operation processing method according to this exemplary embodiment is executed by at least one computer such as the three-dimensional user interface device 100 described above. This three-dimensional operation processing method includes acquiring a line-of-sight image from an operator which is captured by an image capturing unit mounted on a head of the operator, setting a three-dimensional coordinate space on the basis of the acquired line-of-sight image, generating three-dimensional area data representing a transparent virtual three-dimensional operation area arranged in an arbitrary position in the three-dimensional coordinate space in a state in which at least a boundary of the area is visible, causing a display unit mounted on the head of the operator to display the virtual three-dimensional operation area represented by the generated three-dimensional area data by using a visible space in the three-dimensional coordinate space corresponding to a space shown on the line-of-sight image as a display reference, acquiring a three-dimensional position of a specific region of the operator in the three-dimensional coordinate space, and detecting an operation performed by the operator with the specific region in the virtual three-dimensional operation area on the basis of the acquired three-dimensional position and the position of the virtual three-dimensional operation area in the three-dimensional coordinate space.

In this exemplary embodiment, the line-of-sight image from the operator is acquired, and the three-dimensional coordinate space is set on the basis of the acquired line-of-sight image. The line-of-sight image is an image which is captured by the image capturing unit from a direction identical or approximately identical to a direction towards which eyes of the operator are directed. When the virtual three-dimensional operation area is recognized by the operator to be in a real space, the line-of-sight image may not be completely coincident with an image which is visible by the operator. The three-dimensional coordinate space is set from such a line-of-sight image, and thus is consistent with a real space shown on the line-of-sight image. Here, the setting of the three-dimensional coordinate space indicates that triaxial directions, the center point, a coordinate unit, and the like are determined. Furthermore, as a specific setting method of the three-dimensional coordinate space based on the line-of-sight image, a known method may be used, and thus the method will be described as an example in Exemplary embodiment described below in detail.

Further, in this exemplary embodiment, the three-dimensional area data is generated on the basis of the three-dimensional coordinate space which is set in this way. The three-dimensional area data represents the virtual three-dimensional operation area for detecting the operation of the operator, and further represents at least the position of the virtual three-dimensional operation area in the three-dimensional coordinate space. In this exemplary embodiment, the position of the virtual three-dimensional operation area is arbitrary. Then, based on the three-dimensional area data, the virtual three-dimensional operation area is transparently displayed on the display unit mounted on the head of the operator in a state in which at least a boundary of the area is visible. Further, in this exemplary embodiment, the three-dimensional position in the three-dimensional coordinate space relevant to the specific region of the operator is acquired, and the operation performed by the operator with the specific region in the virtual three-dimensional operation area is detected on the basis of the acquired three-dimensional position and the position of the virtual three-dimensional operation area in the three-dimensional coordinate space.

Thus, according to this exemplary embodiment, the virtual three-dimensional operation area for detecting a gesture operation is able to be set in an arbitrary position. Further, the virtual three-dimensional operation area is transparently displayed in a state in which at least the boundary of the area is visible, and thus the operator is able to easily grasp an operation area of the gesture operation. In addition, the virtual three-dimensional operation area is displayed in the arbitrary position by using the visible space in the three-dimensional coordinate space corresponding to the space shown on the line-of-sight image as the display reference, and thus the virtual three-dimensional operation area is visible as an area in the real space, and thus the operator is able to intuitively recognize the operation area. In addition, the operator easily performs the operation by the virtual three-dimensional operation area which is able to be easily and intuitively recognized. As a result thereof, according to this exemplary embodiment, it is possible to improve the usability of the user interface using the gesture operation.

Hereinafter, the exemplary embodiment described above will be further described in detail. Hereinafter, as a detailed exemplary embodiment, a first exemplary embodiment, a second exemplary embodiment, and a third exemplary embodiment are exemplified. The following respective detailed exemplary embodiments are examples in which the three-dimensional user interface device 100 and the three-dimensional operation processing method described above are applied to a three-dimensional user interface system. However, in the following respective detailed exemplary embodiments, only processing relevant to the user interface will be described, and as the contents and a target which are controlled according to the detected operation, a known technology may be used, and thus the contents and the target will not be particularly described.

First Exemplary Embodiment

[System Configuration]

Figure 2:
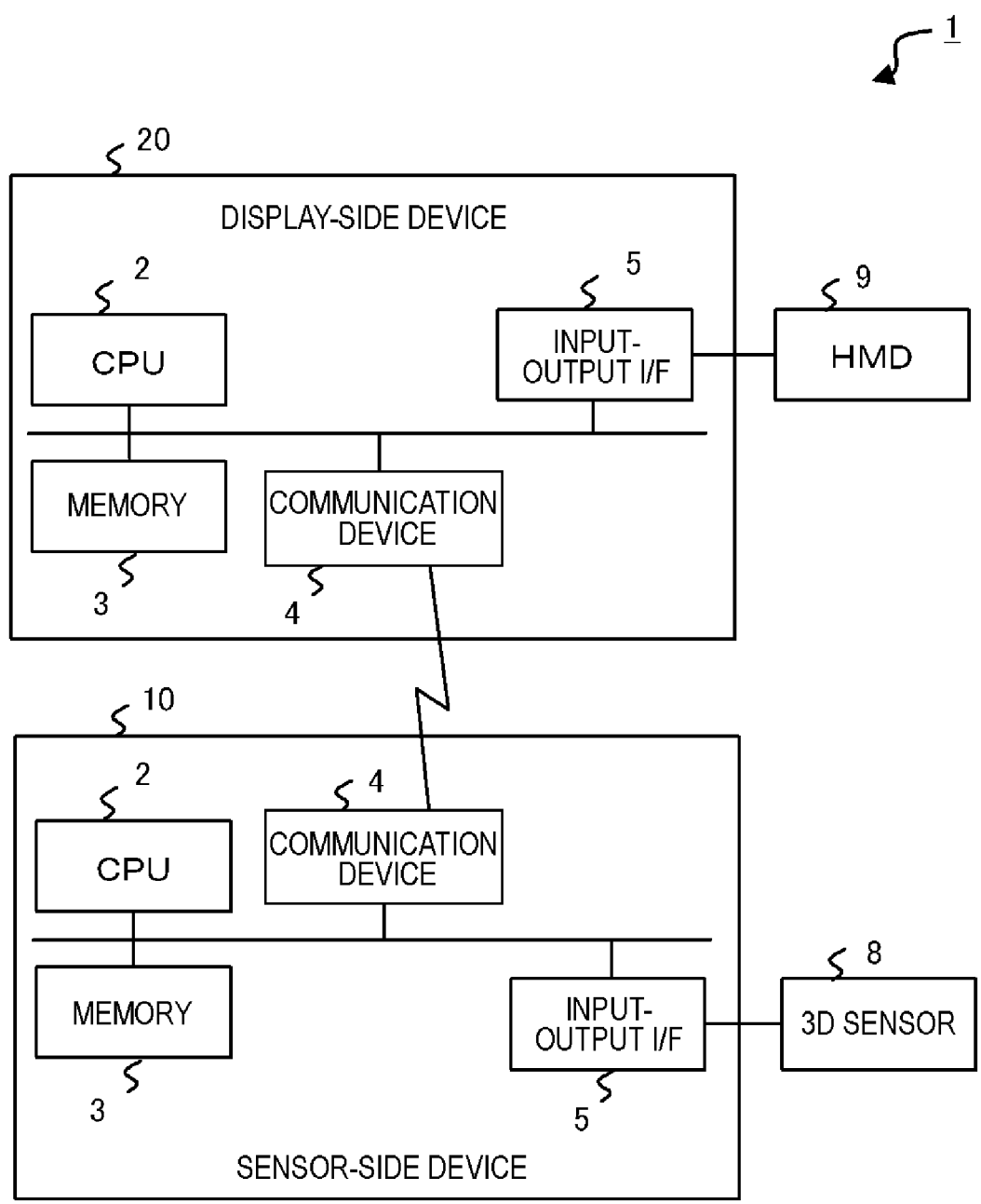
FIG. 2 is a diagram conceptually illustrating a hardware configuration example of a three-dimensional user interface system according to a first exemplary embodiment.

FIG. 2 is a diagram conceptually illustrating a hardware configuration example of a three-dimensional user interface system (hereinafter, simply referred to as a system) 1 according to a first exemplary embodiment. The system 1 according to the first exemplary embodiment has a sensor-side configuration and a display-side configuration. The sensor-side configuration is formed of a three-dimensional sensor (hereinafter, referred to as a 3D sensor) 8 and a sensor-side device 10. The display-side configuration is formed of a head-mounted display (hereinafter, referred to as HMD) 9 and a display-side device 20. Hereinafter, "three-dimensional" will be simply referred to as "3D".

Figure 3:
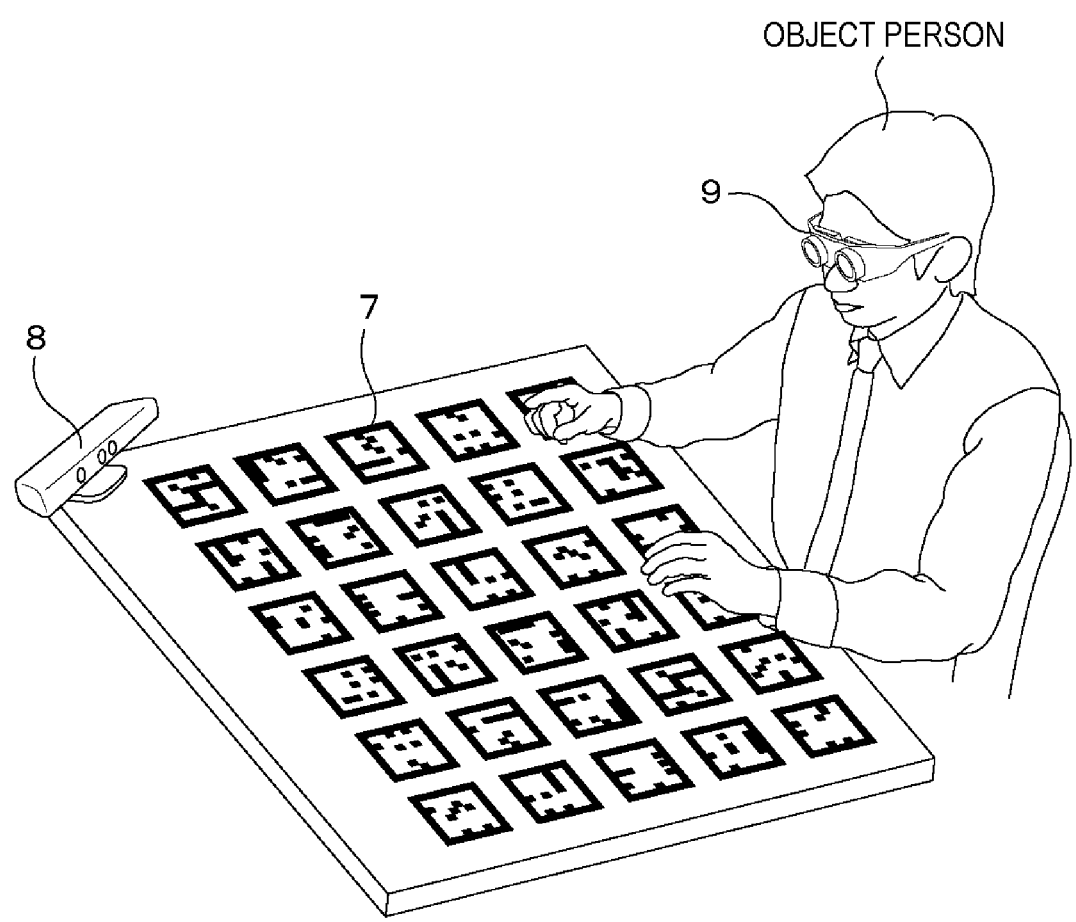
FIG. 3 is a diagram illustrating an example of a usage mode of the three-dimensional user interface system according to the first exemplary embodiment.

FIG. 3 is a diagram illustrating an example of a usage mode of the system 1 according to the first exemplary embodiment. As illustrated in FIG. 3, the 3D sensor 8 is arranged in a position in which a specific region of an operator (a user) is able to be detected. The HMD 9 is mounted on a head of the operator (the user), and captures the line-of-sight image from the operator and displays the virtual 3D operation area described above which is synthesized with the line-of-sight image such that at least the boundary of the area is visible. The operator performs the operation to the virtual 3D operation area shown on a screen image while viewing the screen image which is displayed on the display unit of the HMD 9.

The 3D sensor 8 detects 3D information used, for example, for detecting a specific region of an operator. The 3D sensor 8, for example, is realized with a visible-light camera and a range image sensor, such as Kinect (registered trademark). The range image sensor is also referred to as a depth sensor, in which a pattern with near-infrared light is emitted from a laser to an operator; the pattern is captured with a camera that can detect near-infrared light; and a distance (depth) from the range image sensor to the operator is calculated on the basis of information obtained through the capture. Note that the method of realizing the 3D sensor 8 itself is not limited, and the 3D sensor 8 may be realized with a three-dimensional scanner system using plural visible-light cameras. In addition, in FIG. 2, the 3D sensor 8 is illustrated as one element. However, the 3D sensor 8 may be realized with plural devices including, for example, a visible-light camera that captures a two-dimensional image of the operator and a sensor that detects the distance to the operator.

In this exemplary embodiment, as illustrated in FIG. 3, a three-dimensional coordinate space, which is common to the display-side configuration and the sensor-side configuration, is set with a marker 7 having a known shape. However, a common real object, which is provided for setting the common three-dimensional coordinate space, is not limited only to the dedicated marker 7. The specific form of the common real object is not limited, provided that a certain reference point and three axes directions, which each extend from this certain reference point and intersect with each other at a right angle, can be constantly obtained from the common real object, regardless of the directions of sight. For example, the marker 7 can be replaced with an image or object disposed in a real world.

Figure 4:
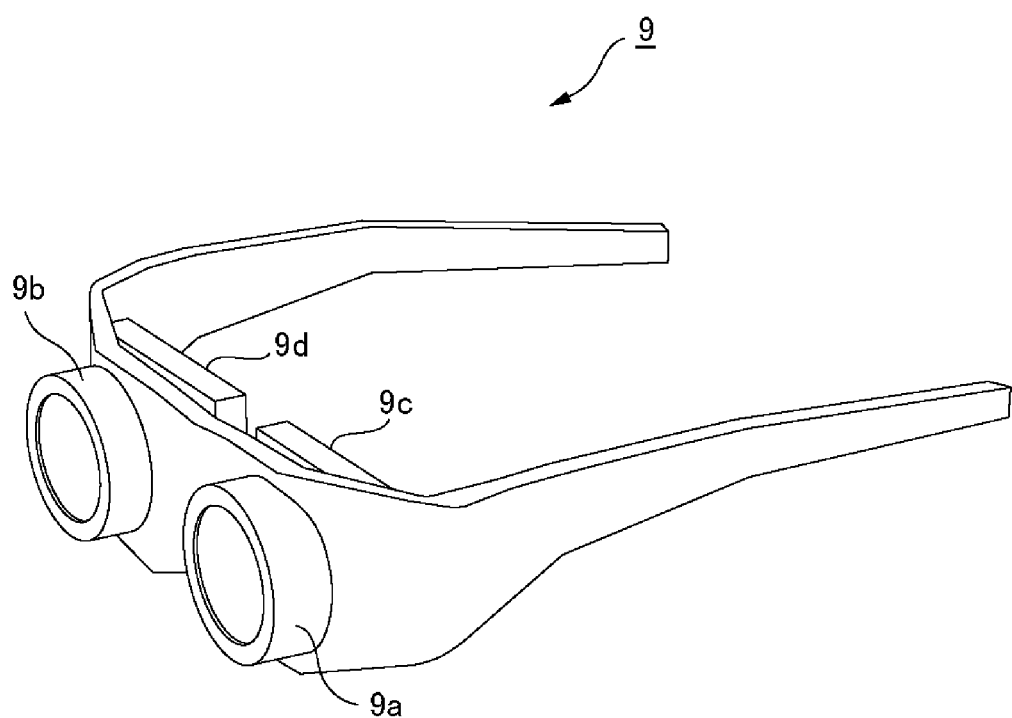
FIG. 4 is a diagram illustrating an example of an outer structure of a head-mounted display (HMD).

FIG. 4 is a diagram illustrating an example of an outer structure of the HMD 9. In FIG. 4, the configuration of the HMD 9 which is referred as a video see-through type is illustrated. In the example of FIG. 4, the HMD 9 includes two wearable cameras 9a and 9b, and two displays 9c and 9d. Each of the wearable cameras 9a and 9b captures each line-of-sight image corresponding to each line-of-sight of the user. Accordingly, the HMD 9 is able to be referred to as an image capturing unit. Each of the displays 9c and 9d is disposed so as to surround the large part of a field of view of a user, and displays a synthesized 3D image in which the virtual 3D operation area is synthesized with each of the line-of-sight images. For this reason, each of the displays 9c and 9d is able to be referred to as a display unit.

The sensor-side device 10 and the display-side device 20 respectively include a Central Processing Unit (CPU) 2, a memory 3, a communication device 4, an input-output interface (I/F) 5, and the like which are connected to each other through a bus or the like. The memory 3 is a Random Access Memory (RAM), a Read Only Memory (ROM), hard disk, a portable storage medium, and the like.

The input-output I/F 5 of the sensor-side device 10 is connected to the 3D sensor 8, and the input-output I/F 5 of the display-side device 20 is connected to the HMD 9. Connection between the input-output I/F 5 and the 3D sensor 8 and connection between the input-output I/F 5 and the HMD 9 are established in a manner that they can wirelessly communicate with each other. Each communication device 4 communicates with other devices (the sensor-side device 10, the display-side device 20, and the like) in a wireless or wired manner. In this exemplary embodiment, such a communication mode is not limited. In addition, specific hardware configurations of the sensor-side device 10 and the display-side device 20 are not limited.

[Processing Configuration]
<Sensor-Side Device>

Figure 5:
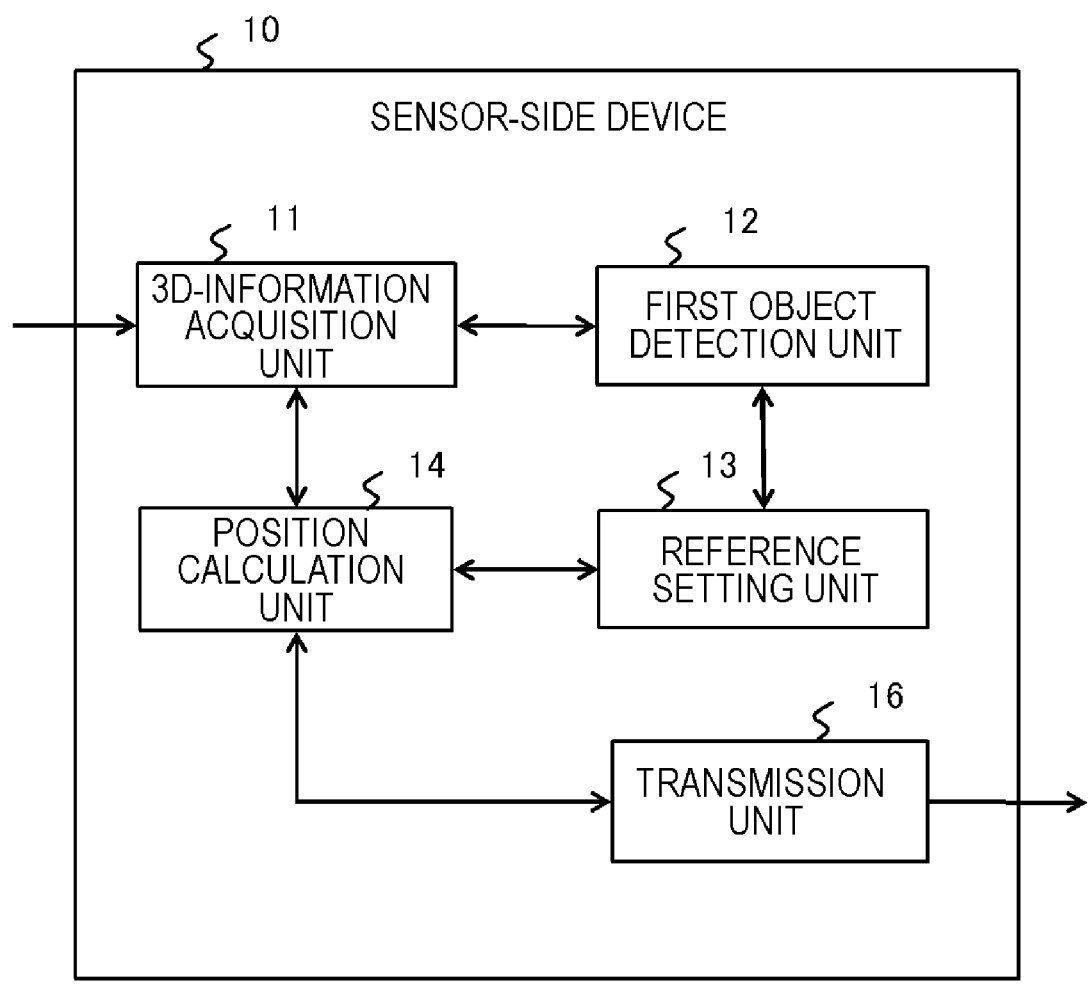
FIG. 5 is a diagram conceptually illustrating a processing configuration example of a sensor-side device according to the first exemplary embodiment.

FIG. 5 is a diagram conceptually illustrating a processing configuration example of the sensor-side device 10 according to the first exemplary embodiment. The sensor-side device 10 according to the first exemplary embodiment includes a 3D-information acquisition unit 11, a first object detection unit 12, a reference setting unit 13, a position calculation unit 14, a transmission unit 16, and the like. Each of these units is realized, for example, with the CPU 2 performing a program stored in the memory 3. In addition, the program may be installed, for example, from a portable recording medium such as a Compact Disc (CD), a memory card or other computers on a network through the input-output I/F 5, and may be stored in the memory 3.

The 3D-information acquisition unit 11 sequentially acquires the 3D information detected by the 3D sensor 8. The 3D information includes the two-dimensional image concerning an operator and obtained with the visible light and information on the distance (a depth) from the 3D sensor 8. The 3D sensor 8 may be configured with plural units such as a visible-light camera and a depth sensor.

The first object detection unit 12 detects a known common real object on the basis of the 3D information which is acquired by the 3D-information acquisition unit 11. In this exemplary embodiment, the marker 7 illustrated in FIG. 3 is used as the common real object. The first object detection unit 12 retains, in advance, information on a shape, size, color, and the like that the marker 7 has, and detects the marker 7 on the basis of the 3D information by using the known information as described above.

The reference setting unit 13 sets a 3D coordinate space on the basis of the marker 7 which is detected by the first object detection unit 12, and calculates the position and the direction of the 3D sensor 8 in the 3D coordinate space. For example, the reference setting unit 13 sets 3D coordinate space in which a reference point extracted from the marker 7 is set to an original point, and three directions extending from the reference point and intersecting with each other are set to each axis. The reference setting unit 13 calculates the position and the direction of the 3D sensor 8 by comparing the known shape and size of the marker 7 with the shape and size of the marker 7 extracted from the 3D information.

The position calculation unit 14 sequentially calculates 3D position information on the specific region of the operator in the 3D coordinate space by using the 3D information which is sequentially acquired by the 3D-information acquisition unit 11. In this exemplary embodiment, the position calculation unit 14, specifically, calculates the 3D position information as follows. The position calculation unit 14, first, extracts the 3D position information on the specific region of the operator on the basis of the 3D information which is acquired from the 3D-information acquisition unit 11. Here, the extracted 3D position information corresponds to a camera coordinate system of the 3D sensor 8. Then, the position calculation unit 14 converts the 3D position information corresponding to the camera coordinate system of the 3D sensor 8 into the 3D position information in the 3D coordinate space which is set by the reference setting unit 13 on the basis of the position and the direction of the 3D sensor 8 which are calculated by the reference setting unit 13, and the 3D coordinate space. This conversion means conversion from the camera coordinate system of the 3D sensor 8 into a 3D coordinate system which is set on the basis of the marker 7.

Here, the number of specific regions of the operator to be detected may be two or more. For example, it may be possible to employ a form in which both hands of the operator are used as plural specific regions. In this case, the position calculation unit 14 extracts 3D positional information on each of the plural specific regions from the 3D information acquired by the 3D-information acquisition unit 11, and converts the extracted 3D positional information into 3D positional information in the 3D coordinate space. Furthermore, the specific region represents a part of a body of an operator used for performing operations, and hence, has a certain area or volume. Thus, the 3D positional information calculated by the position calculation unit 14 may be positional information on one point in the specific region, or may be positional information on plural points.

The transmission unit 16 transmits the 3D position information in the 3D coordinate space, which is relevant to the specific region of the operator and is calculated by the position calculation unit 14, to the display-side device 20.

<Display-Side Device>

Figure 6:
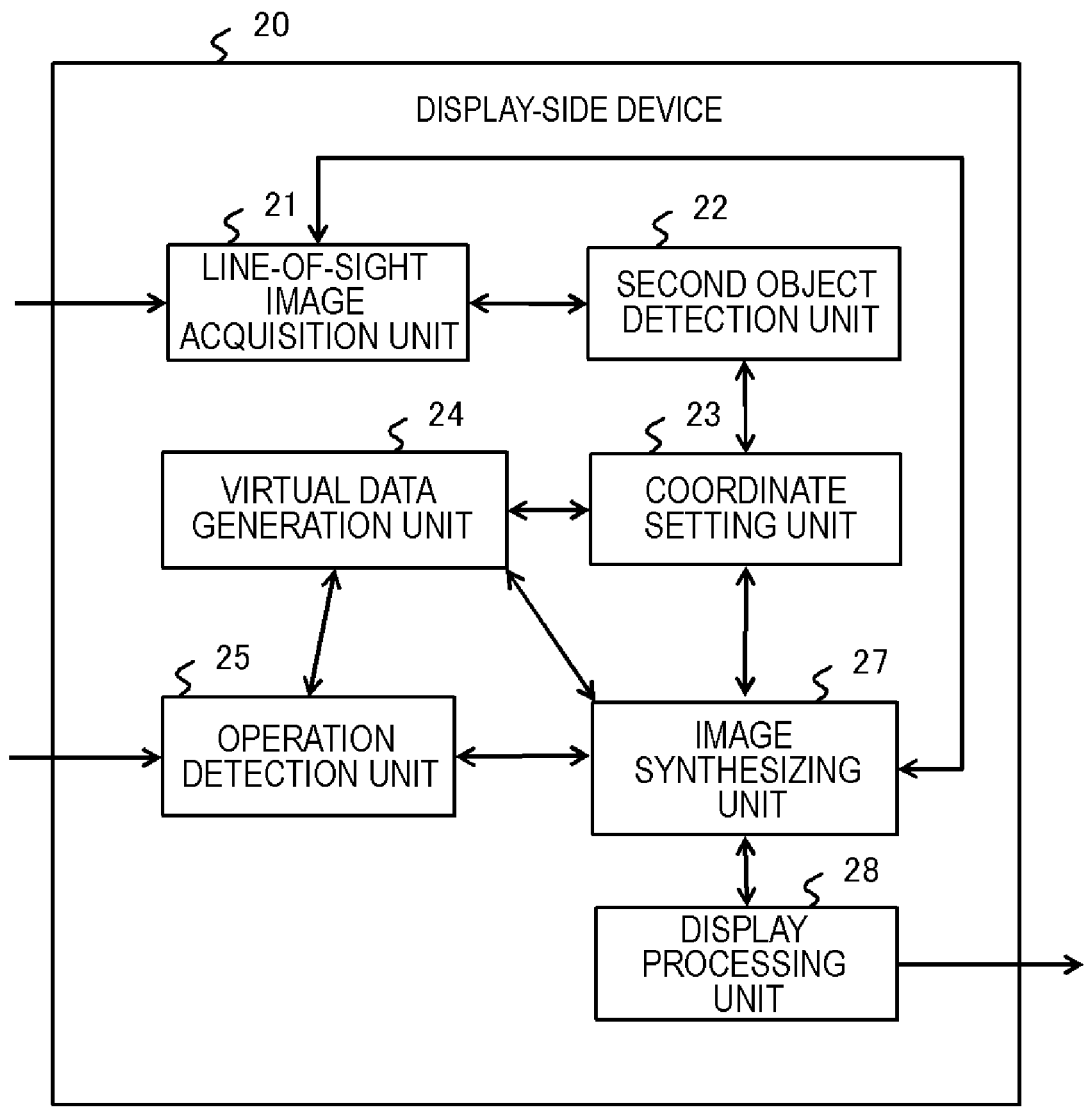
FIG. 6 is a diagram conceptually illustrating a processing configuration example of a display-side device according to the first exemplary embodiment.

FIG. 6 is a diagram conceptually illustrating a processing configuration example of the display-side device 20 according to the first exemplary embodiment. The display-side device 20 according to the first exemplary embodiment includes a line-of-sight image acquisition unit 21, a second object detection unit 22, a coordinate setting unit 23, a virtual data generation unit 24, an operation detection unit 25, an image synthesizing unit 27, a display processing unit 28, and the like. Each of these units is realized, for example, with the CPU 2 performing a program stored in the memory 3. In addition, the program, for example, may be installed from a portable recording medium such as a Compact Disc (CD), a memory card or other computers on a network through the input-output I/F 5, and may be stored in the memory 3.

The line-of-sight image acquisition unit 21 acquires the line-of-sight image, as with the line-of-sight image acquisition unit 101 described above. When the operator performs the operation to the virtual 3D operation area, the same specific region as that of the specific region of the operator which is detected by the sensor-side device 10 is shown on the line-of-sight image. In this exemplary embodiment, the wearable cameras 9a and 9b are disposed, and thus the line-of-sight image acquisition unit 21 acquires a line-of-sight image corresponding to each of a left eye and a right eye. Note that each of the units similarly performs processing to both of the line-of-sight images corresponding to the left eye and the right eye, and hence, the explanation below will target at only one line-of-sight image.

The second object detection unit 22 detects a known common real object that is the same as that detected by the sensor-side device 10, from the line-of-sight image acquired by the line-of-sight image acquisition unit 21. In other words, in this exemplary embodiment, the second object detection unit 22 detects the marker 7 illustrated in FIG. 3. The second object detection unit 22 performs its processing in a similar manner to the first object detection unit 12 of the sensor-side device 10 described above, and hence, specific description thereof will not be repeated here. Note that the image-capturing direction differs between the marker 7 contained in the line-of-sight image and the marker 7 contained in the 3D information acquired by the 3D sensor 8.

The coordinate setting unit 23 sets a 3D coordinate space, which is the same as that set by the reference setting unit 13 of the sensor-side device 10, on the basis of the marker 7 detected by the second object detection unit 22, and calculates the position and the direction of the HMD 9. The coordinate setting unit 23 also performs its processing in a similar manner to the reference setting unit 13 of the sensor-side device 10, and hence, specific description thereof will not be repeated here. The coordinate setting unit 23 also sets a 3D coordinate space on the basis of the common real object (marker 7), which is the same the common real object as the reference setting unit 13 of the sensor-side device 10 uses to set the 3D coordinate space. Consequently, the sensor-side device 10 and the display-side device 20 share this 3D coordinate space.

The virtual data generation unit 24 generates 3D area data, as with the virtual data generation unit 103 described above. As described above, the 3D area data represents the position, the size, the shape, and the like of the virtual 3D operation area in the 3D coordinate space. When plural virtual 3D operation areas are set, the virtual data generation unit 24 generates plural 3D area data each representing an operation type in addition to the position, the size, the shape, and the like of each of the plural virtual 3D operation areas in the 3D coordinate space. In this exemplary embodiment, the specific contents of the 3D area data are not limited, provided that the position and the form (the shape, the size, the color, the pattern, and the like) of the virtual 3D operation area in the 3D coordinate space can be determined. The shape set in the virtual 3D operation area is able to be the shape of a cube, a parallelepiped rectangle, a sphere, an ellipsoidal body, a Japanese DORAYAKI, and the like. The DORAYAKI-like shape means a stereoscopic shape of overlapping parts when two spheres intersect with each other.

The operation type set in the virtual 3D operation area means the type of the gesture operation corresponding to the information type which is detected from the movement of the specific region of the operator in the virtual 3D operation area. This operation type includes, for example, an operation type in which operation contents are specified on the basis of three-dimensional (triaxial) position change information (hereinafter, referred to as a 3D gesture type), an operation type in which operation contents are specified on the basis of two-dimensional (biaxial) position change information (hereinafter, referred to as a 2D gesture type), an operation type in which operation contents are specified on the basis of one-dimensional (monoaxial) position change information (hereinafter, referred to as a 1D gesture type), and an operation type in which operation contents are specified on the basis of whether or not the specific region is in contact with the virtual 3D operation area (hereinafter, referred to as a 0D gesture type). Furthermore, in this exemplary embodiment, the specific contents of the operation type which are set in the virtual 3D operation area are not limited. A specific example of the form and the operation type set in the virtual 3D operation area will be described below.

Information set in the virtual 3D operation area, such as the position, size, shape, operation type, and the like, may be information which is input by the operator with an input device (not illustrated) connected to the input-output I/F 5 on the basis of an input screen or the like, may be information acquired from the portable recording medium, the other computer, and the like through the communication device 4 or the input-output I/F 5, or may be information which is retained in advance by the virtual data generation unit 24 as an initial value. The information set in the virtual 3D operation area is able to be arbitrarily set according to the operator or the like.

The image synthesizing unit 27 synthesizes the virtual 3D operation area with the line-of-sight image which is acquired by the line-of-sight image acquisition unit 21 on the basis of the position and the direction of the HMD 9, the 3D coordinate space, and the 3D area data. At this time, the position and the form of the virtual 3D operation area is determined by using the visible space in the three-dimensional coordinate space corresponding to the space shown on the line-of-sight image as a display reference. In addition, in this exemplary embodiment, the image synthesizing unit 27 generates each synthesized image based on each of the line-of-sight images captured by the wearable cameras 9a and 9b. Furthermore, a known method used in augmented reality (AR) or the like may be used in the synthesizing processing of the image synthesizing unit 27, and thus here, the detailed description will not be repeated.

The display processing unit 28 causes the HMD 9 to display the virtual 3D operation area, as with the display processing unit 104 described above. In this exemplary embodiment, the display processing unit 28 causes the HMD 9 to display the synthesized image of the virtual 3D operation area and the line-of-sight image. Accordingly, each of the synthesized images corresponding to each of the line-of-sights of the operator is displayed on each of the displays 9c and 9d, and thus the line-of-sight image and the virtual 3D operation area are three-dimensionally visible by the operator according to a binocular disparity.

The operation detection unit 25 receives the 3D position information on the specific region of the operator in the 3D coordinate space from the sensor-side device 10, and detects the operation performed by the operator with the specific region in the virtual 3D operation area on the basis of the position of the specific region of the operator in the 3D coordinate space and the position of the virtual 3D operation area. The operation detection unit 25 corresponds to the position acquisition unit 105 and the operation detection unit 106 described above. At this time, the operation detection unit 25 specifies the virtual 3D operation area in which the operation is detected, and acquires the operation information corresponding to the operation type which is set in the virtual 3D operation area. Specifically, when the 2D gesture type is set in the virtual 3D operation area, the operation detection unit 25 acquires the two-dimensional change information of the specific region of the operator in the virtual 3D operation area, and acquires a value corresponding to the two-dimensional change information as the operation information. A specific relationship between the virtual 3D operation area and the detected operation to be detected will be described below.

Figure 7A:
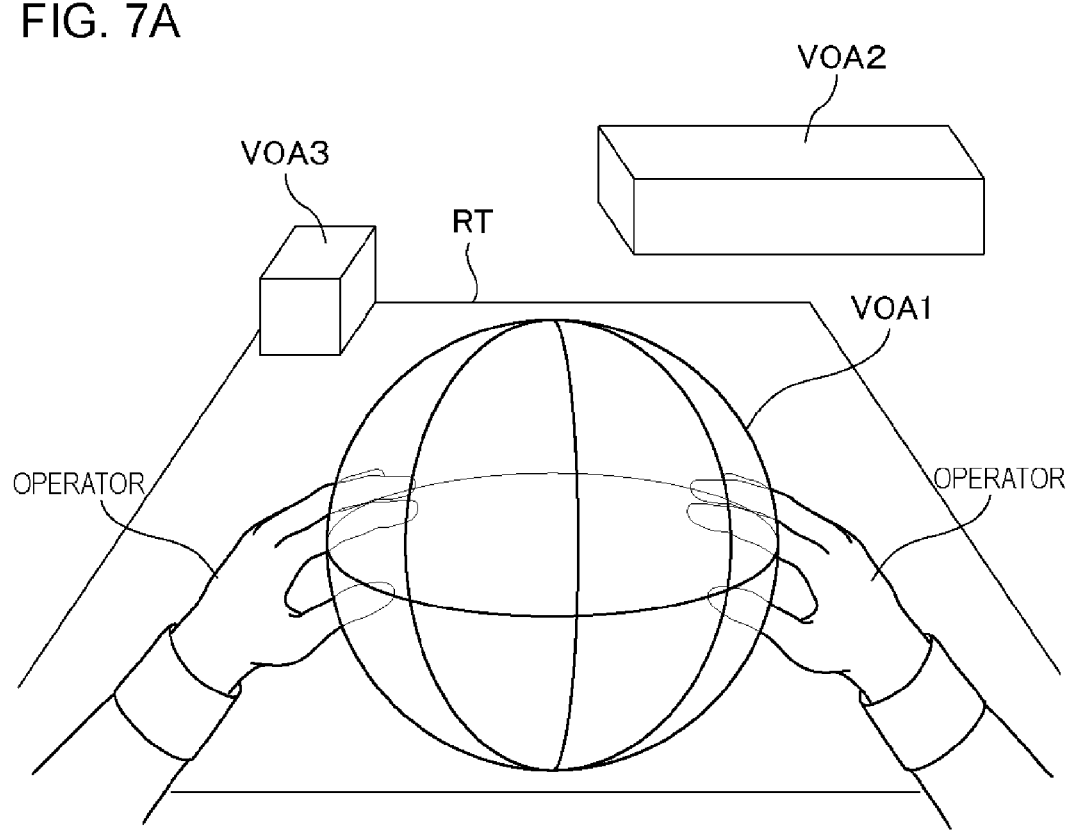
FIG. 7A is a diagram illustrating an example of a synthesized image displayed on the head-mounted display (HMD).

FIG. 7A is a diagram illustrating an example of the synthesized image which is displayed on the HMD 9. The synthesized image illustrated in the example of FIG. 7A includes a table RT of the actual world shown on the line-of-sight image, and three virtual 3D operation areas VOA1, VOA2, and VOA3. VOA1 is formed in the shape of a sphere, VOA2 is formed in the shape of a parallelepiped rectangle, and VOA3 is formed in the shape of a cube. For example, different operation types are set in the virtual 3D operation areas VOA1, VOA2, and VOA3. For example, the 3D gesture type is set in VOA1, the 1D gesture type is set in VOA2, and the 0D gesture type is set in VOA3.

Figure 7B:
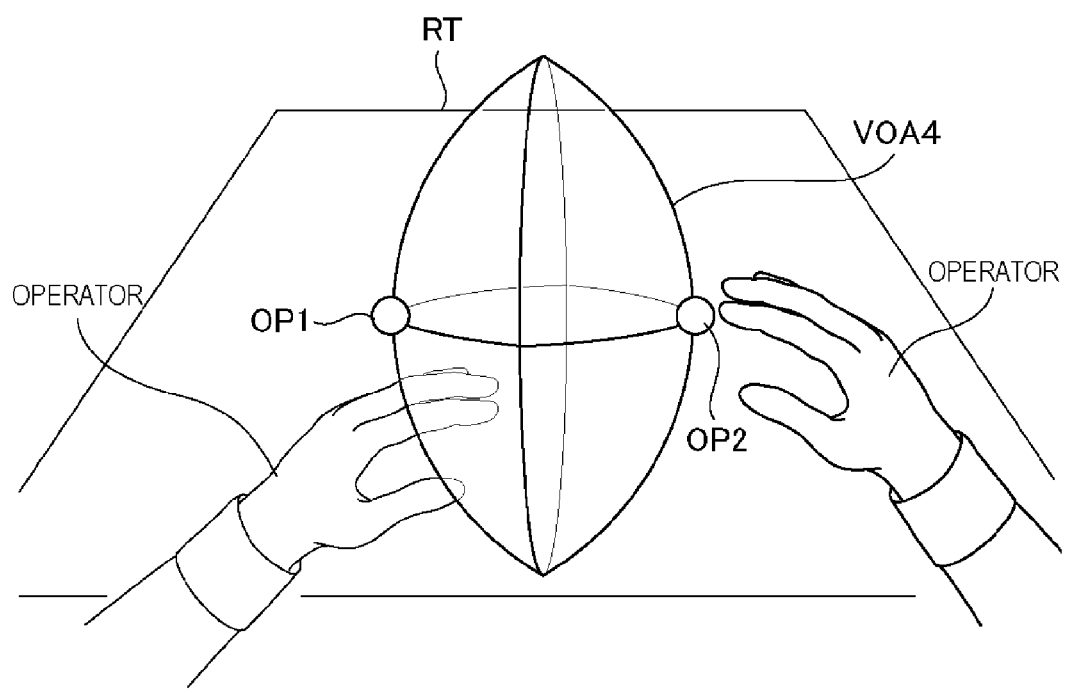
FIG. 7B is a diagram illustrating another example of the synthesized image displayed on the head-mounted display (HMD).

FIG. 7B is a diagram illustrating another example of the synthesized image which is displayed on the HMD 9. The synthesized image illustrated in the example of FIG. 7B includes the table RT of the actual world shown on the line-of-sight image, and a DORAYAKI-type virtual 3D operation area VOA4. In VOA4, for example, the 1D gesture type is set.

In addition, as illustrated in FIG. 7A and FIG. 7B, each of the virtual 3D operation areas is translucently displayed such that the area boundary is visible. Thus, according to this exemplary embodiment, the virtual 3D operation area is visible by the operator in a state in which the virtual 3D operation area which has an arbitrary shape and is arranged in an arbitrary position is superimposed on the actual world such that a real object of the actual world is not hindered.

Here, a relationship between the shape of the virtual 3D operation area and the operation to be detected will be described.

Figure 8:
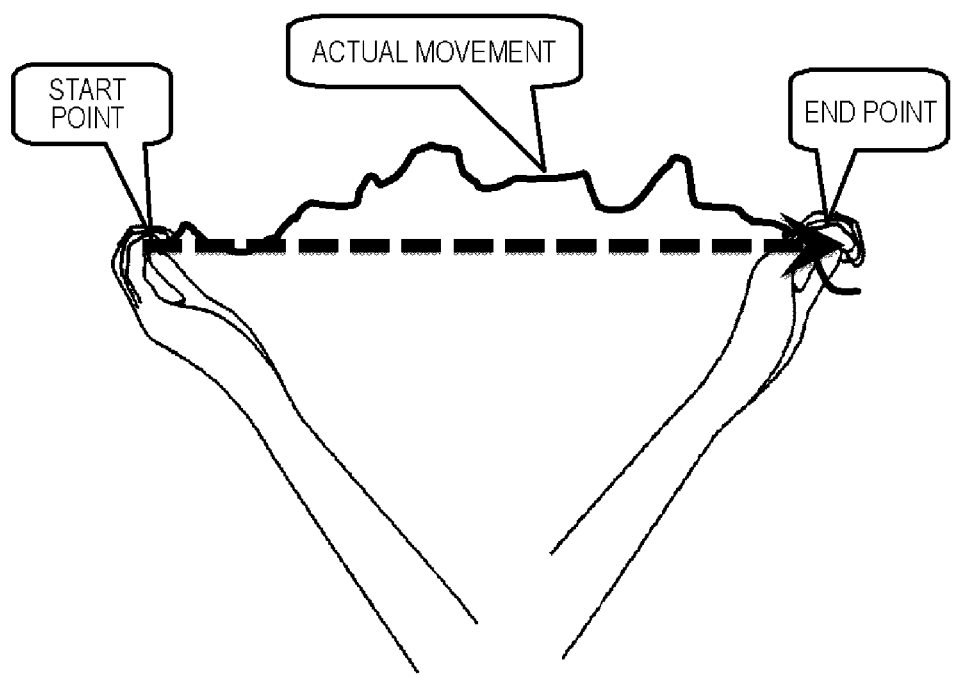
FIG. 8 is a diagram conceptually illustrating an actual movement of a specific region of an operator.

FIG. 8 is a diagram conceptually illustrating an actual movement of the specific region of the operator. The present inventors have found the following problems relevant to the gesture operation. That is, in the gesture operation, there is no direct contact or guide between the user and the user interface with respect to the operation, and thus when the operator desires to perform the gesture operation of moving a tip of a finger (the specific region) from one position (a start point) to the other position (an end point), it is difficult to move the tip of the finger on a straight line connecting the start point and the end point, and thus as illustrated in FIG. 8, the tip of the finger usually draws a locus deviating from the straight line. Accordingly, in the 1D gesture type described above, when a method of detecting the locus of the tip of the finger only on one axis is adopted, it is difficult for the operator to use the user interface.

Therefore, the present inventors have conceived that it is preferable to form the virtual 3D operation area including the 1D gesture type set therein in which the operation contents are specified on the basis of the one-dimensional (monoaxial) position change information to have a stereoscopic shape and to detect the movement of the specific region of the operator in the shape.

Figure 9:
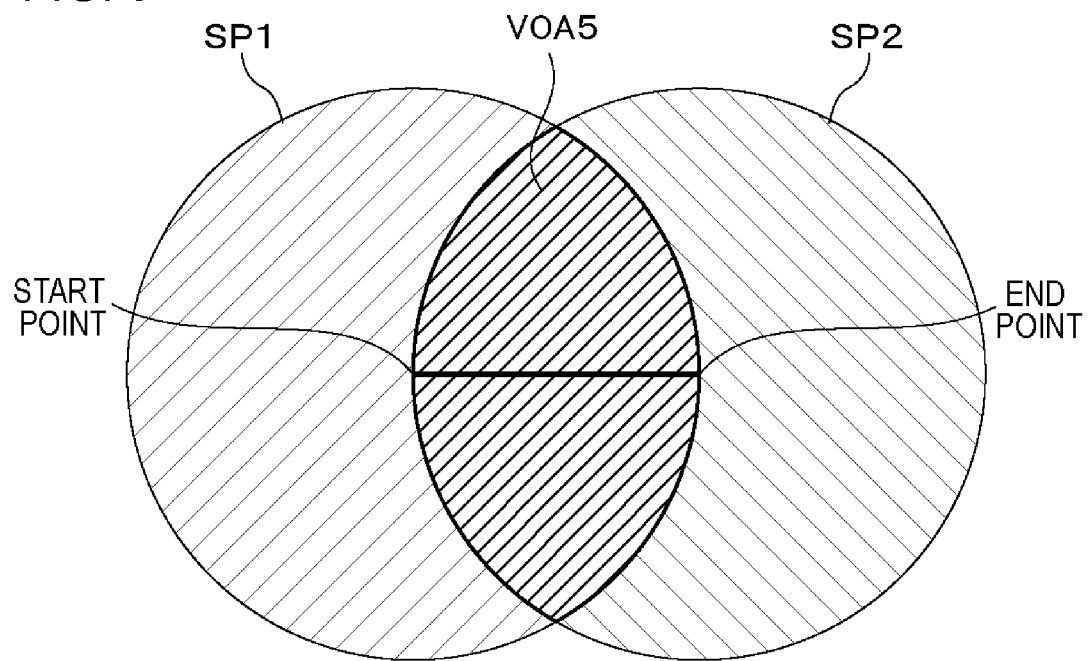
FIG. 9 is a diagram conceptually illustrating an example of a relationship between a Japanese DORAYAKI-type virtual three-dimensional operation area and a detected operation.

FIG. 9 is a diagram conceptually illustrating an example of a relationship between the DORAYAKI-type virtual 3D operation area and the operation to be detected. As illustrated in FIG. 9, the virtual 3D operation area VOA5 has a DORAYAKI-like shape corresponding to an overlapping part between a spherical body SP1 and a spherical body SP2. This shape is formed by setting the start point to the center point of the spherical body SP1, by setting the end point to the center point of the spherical body SP2, and by setting a distance from each of the center points to a point on each of the spherical surfaces to be half of a length between the start point and the end point. The 1D gesture type is set in VOA5, and the operation detection unit 25 acquires a position change amount of the specific region of the operator on a detection axis connecting the start point and the end point as the operation information.

At this time, the operation detection unit 25 acquires a value corresponding to a position in which the three-dimensional position of the specific region of the operator in VOA5 is projected onto the detection axis as the operation information. For example, when a value (−100) is set on the start point, and a value (100) is set on the end point, the operation detection unit 25 calculates a value corresponding to the position from a ratio of a distance between the position on the detection axis indicated as the operation information and the start point and a distance between the position and the end point. Further, when the specific region is moved from VOA5 into the spherical body SP1, the operation detection unit 25 acquires the value (−100) corresponding to the start point, and when the specific region is moved from VOA5 into the spherical body SP2, the operation detection unit 25 acquires the value (100) corresponding to the end point.

Thus, the DORAYAKI-type virtual 3D operation area is set for the 1D gesture type, and thus even when the operation performed by the operator with the specific region is shifted from the detection axis to a certain degree, it is possible to suitably acquire the operation information. Further, according to the DORAYAKI-like shape, a detection margin decreases as it gets closer to the start point and the end point, and the detection margin increases as it gets farther from the start point and the end point. This is coincident with the properties of the manner of the movement of the specific region of the operator. In a case where the specific region is moved from one target (the start point) to the other target (the end point), when the straight line connecting the targets is not visible by the operator, it is possible to dispose the specific region to be close to the target in the vicinity of each of the targets, but the specific region is generally easily separated from the straight line at the time of being separated from each of the targets. Accordingly, the DORAYAKI-type virtual 3D operation area is set for the 1D gesture type, and thus the operation feeling of the operator is matched to the virtual 3D operation area, and it is possible to realize a user interface which is easily used by the operator. Such an effect is also able to be obtained in an ellipsoidal body which is obtained by rotating an ellipse, in which a line connecting the start point and the end point is set as a long diameter (a length of a long axis) and a short diameter (a length of a short axis) is arbitrarily set, around the long axis. However, the shape of the virtual 3D operation area set for the 1D gesture type is not limited to a DORAYAKI-like shape or an ellipsoidal shape, and may be other stereoscopic shapes such as the shape of a cube, a parallelepiped rectangle, a sphere, and the like.

Operation Example

Figure 10:
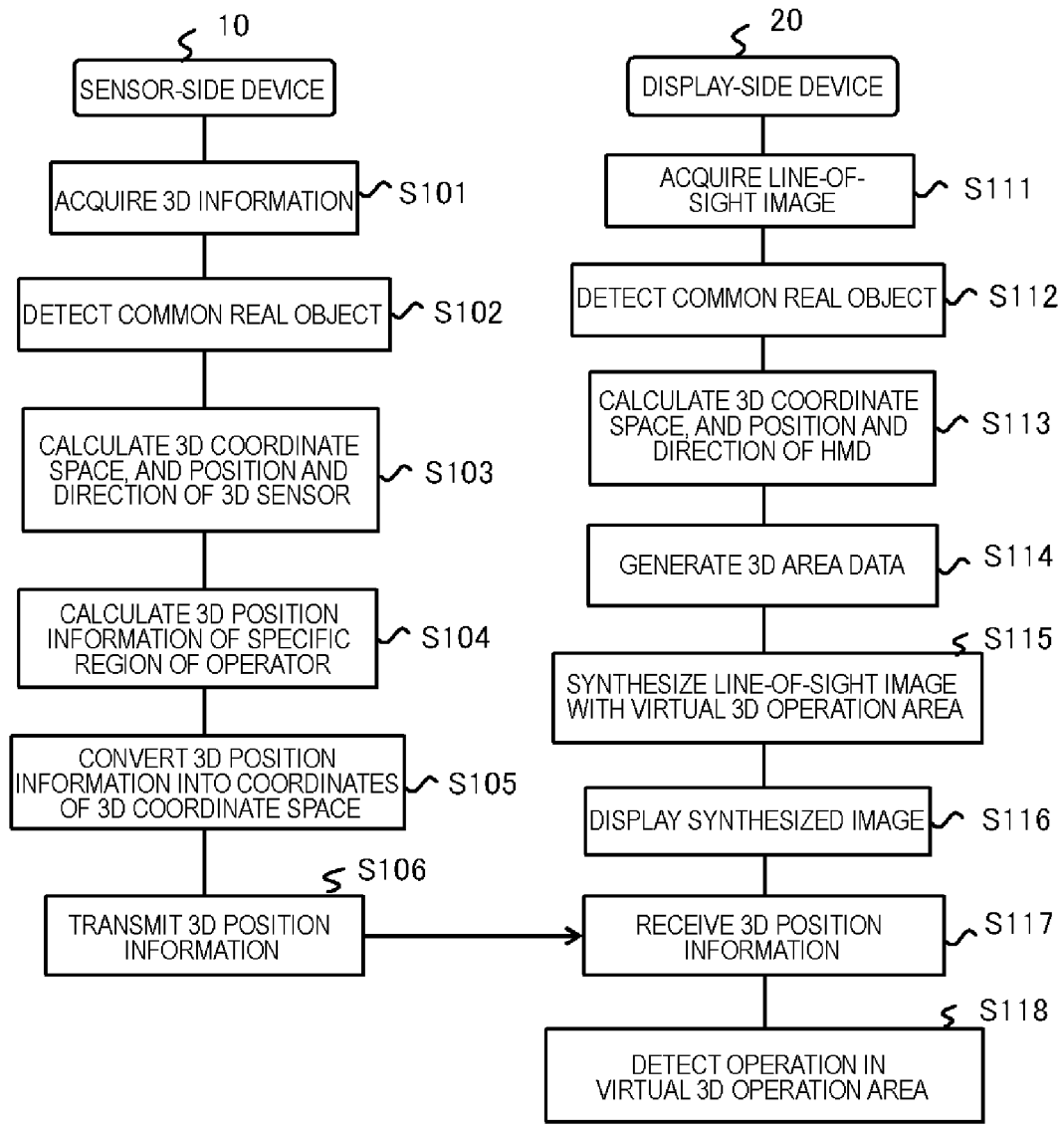
FIG. 10 is a sequence chart illustrating an operation example of the three-dimensional user interface system according to the first exemplary embodiment.

Hereinafter, a three-dimensional operation processing method according to the first exemplary embodiment will be described with reference to FIG. 10. FIG. 10 is a sequence chart illustrating an operation example of the system 1 according to the first exemplary embodiment. Hereinafter, the sensor-side device 10 or the display-side device 20 will be described as an execution subject of each method, and the execution subject may be at least one computer configuring the system 1.

The sensor-side device 10 sequentially acquires the 3D information from the 3D sensor 8 (S101). The 3D information includes information on the marker 7 as the common real object and the specific region of the operator. The sensor-side device 10 operates the following with respect to the 3D information with a predetermined frame rate.

The sensor-side device 10 detects the common real object (the marker 7) on the basis of the 3D information (S102). Subsequently, the sensor-side device 10 sets the 3D coordinate space on the basis of the detected common real object, and calculates the position and the direction of the 3D sensor 8 in the 3D coordinate space (S103).

Further, the sensor-side device 10 calculates the 3D position information of the specific region of the operator by using the 3D information (S104). Further, the sensor-side device 10 converts the 3D position information calculated in Step (S104) into the 3D position information on the 3D coordinate space set in Step (S103) on the basis of the position and the direction of the 3D sensor 8 calculated in Step (S103) and the 3D coordinate space (S105).

The sensor-side device 10 transmits the 3D position information on the specific region of the operator which is obtained in Step (S105) to the display-side device 20 (S106). In FIG. 7, for the sake of the convenience of the description, an example is illustrated in which Steps (S102) and (S103) are executed at a predetermined frame rate of the 3D information, and Steps (S102) and (S103) may be executed only at the time of performing calibration.

On the other hand, the display-side device 20 sequentially acquires the line-of-sight image from the HMD 9 asynchronously to the acquisition of the 3D information (S101) (S111). The display-side device 20 operates the following with respect to the line-of-sight image with a predetermined frame rate.

The display-side device 20 detects the same common real object (the marker 7) as that detected by the sensor-side device 10 on the basis of the line-of-sight image (S112). Subsequently, the display-side device 20 sets the 3D coordinate space on the basis of the detected common real object and calculates the position and the direction of the HMD 9 in the 3D coordinate space (S113). The same marker 7 (the common real object) is used, and thus the 3D coordinate space is shared between the sensor-side device 10 and the display-side device 20.

The display-side device 20 generates the 3D area data as described above (S114). This 3D area data includes information on the virtual 3D operation area, such as the position, the size, the shape, and the display mode (a transparent display mode in a state in which at least the boundary of the area is visible) in the 3D coordinate space set in (S113). Such setting information on the virtual 3D operation area is acquired by an arbitrary method as described above. When plural virtual 3D operation areas are set, the display-side device 20 generates each 3D area data representing each of the virtual 3D operation areas.

The display-side device 20 synthesizes the line-of-sight image acquired in (S111) with the virtual 3D operation area based on the 3D area data generated in (S114) on the basis of the 3D coordinate space set in (S113) (S115). The display-side device 20 causes the HMD 9 to display an image obtained by the synthesizing (S116).

When the display-side device 20 receives the 3D position information on the specific region of the operator from the sensor-side device 10 (S117), the display-side device 20 detects the operation performed by the operator with the specific region in the virtual 3D operation area on the basis of the position of the specific region of the operator in the 3D coordinate space and the position of the virtual 3D operation area (S118). In the detection of the operation, the display-side device 20 specifies the virtual 3D operation area in which the operation is detected, and acquires the operation information corresponding to the operation type which is set in the virtual 3D operation area. The operation information is information indicating the operation content performed by the operator with the specific region and corresponding to the operation type.

The system 1 performs control corresponding to the operation detected in (S118).

In FIG. 10, for the sake of the convenience of the description, an example is illustrated in which (S112) to (S114) are executed at a predetermined frame rate of the line-of-sight image, and (S112) and (S113) may be executed only at the time of performing the calibration, and (S114) may be executed at the time of setting the virtual 3D operation area or activating the system 1.

[Action and Effect of First Exemplary Embodiment]

Thus, in the first exemplary embodiment, the 3D coordinate space is shared between the sensor-side device 10 and the display-side device 20 on the basis of the common real object (the marker 7) shown on the image information which is obtained by each of the HMD 9 and the 3D sensor 8. Then, the line-of-sight image and the virtual 3D operation area are synthesized on the basis of the 3D coordinate space such that the virtual 3D operation area is transparently displayed in a state in which at least the area boundary is visible, and this synthesized image is displayed on the HMD 9 which is mounted on the head of the operator.

Accordingly, the virtual 3D operation area is visible by the operator as if the virtual 3D operation area is in the actual world at hand. Further, the virtual 3D operation area is transparently displayed in a state in which at least the boundary of the area is visible, and thus the object and the background in the actual world are visible without being blocked by the virtual 3D operation area. That is, according to the first exemplary embodiment, the operator is able to intuitively grasp a stereoscopic operation area.

Further, in the first exemplary embodiment, the sensor (the 3D sensor 8) for measuring the position of the specific region of the operator is disposed separately from the image capturing unit (the wearable camera 9a and the wearable camera 9b) by which the line-of-sight image is obtained, the positional relationships between the specific region of the operator in the common 3D coordinate space as described above and the virtual 3D operation area are compared, and thus the operation performed by the operator with the specific region in the virtual 3D operation area is detected.

Accordingly, according to the first exemplary embodiment, it is possible to accurately detect the positional relationship between the virtual 3D operation area in the space shown on the line-of-sight image and the specific region of the operator, and as a result thereof, it is possible to impart an intuitive operation feeling to the operator as if the operator is in direct contact with the virtual 3D operation area.

In addition, in the first exemplary embodiment, the display mode of the virtual 3D operation area is determined on the basis of the position for disposing the virtual 3D operation area, size, shape, and the like which are set by using an arbitrary method according to the operator or the like. Accordingly, according to the first exemplary embodiment, it is possible to freely set a stereoscopic operation area for detecting the gesture operation of the operator.

In addition, according to the first exemplary embodiment, as illustrated in FIG. 3, it is possible to set a plurality of virtual 3D operation areas, and it is possible to set the operation type which is different for each of the virtual 3D operation areas. Accordingly, it is possible to allow a designer or a user (the operator) to freely design the three-dimensional user interface. For example, when plural virtual 3D operation areas each using the operation type which specifies the operation contents by information having a small number of dimensions such as the 1D gesture type are used, it is possible to identify plural operation contents even when a fine movement (a gesture) is not able to be recognized according to the measurement accuracy of the 3D sensor 8 or the recognition accuracy of the specific region of the operator.

Thus, according to the first exemplary embodiment, it is possible to allow the operator to easily recognize the operation area and to allow the operator to freely dispose a plurality of operation areas, and thus it is possible to improve the usability of the user interface.

Second Exemplary Embodiment

In the system 1 of a second exemplary embodiment, movement, resizing, rotation, modification, and the like with respect to the virtual 3D operation area itself to be displayed are available. Hereinafter, the system 1 of the second exemplary embodiment will be described on the basis of the contents different from that of the first exemplary embodiment. In the following description, the same contents as those of the first exemplary embodiment will not be repeated.

[Processing Configuration]
<Sensor-Side Device>

Figure 11:
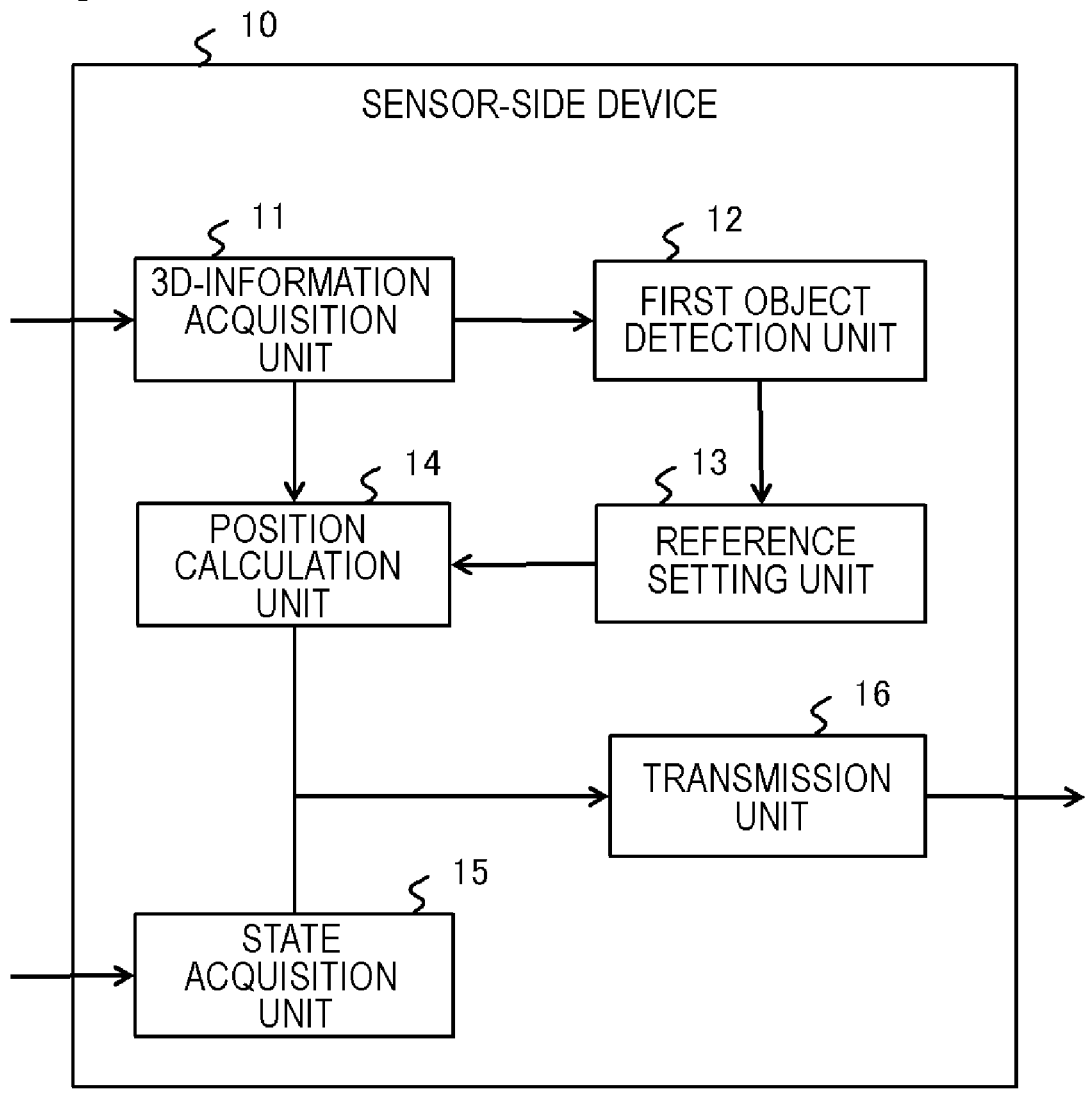
FIG. 11 is a diagram conceptually illustrating a processing configuration example of a sensor-side device according to a second exemplary embodiment.

FIG. 11 is a diagram conceptually illustrating a processing configuration example of the sensor-side device 10 according to the second exemplary embodiment. The sensor-side device 10 according to the second exemplary embodiment further includes a state acquisition unit 15 in addition to the configuration of the first exemplary embodiment. The state acquisition unit 15 is realized as with the other unit.

The state acquisition unit 15 acquires state information of the specific region of the operator. The state information of the specific region is information which is able to specify a state relevant to the shape of the specific region, and for example, indicates a clenching state, an opening state, a thumb erect state, and the like. This specific region is identical to the specific region which is a detection target in the position calculation unit 14. In this exemplary embodiment, the number of states which is able to be indicated by the state information is not limited within a detectable range. In addition, when a plurality of specific regions is used, the state acquisition unit 15 acquires each state information relevant to each of the specific regions.

The state acquisition unit 15, for example, retains image feature information corresponding to each of the states for identifying the specific region in advance, and acquires the state information of the specific region by comparing feature information extracted from a 2D image included in the 3D information which is acquired by the 3D-information acquisition unit 11 with each of the image feature information retained in advance. In addition, the state acquisition unit 15 may acquire the state information of the specific region on the basis of information which is obtained from a strain sensor (not illustrated) mounted in the specific region. In addition, the state acquisition unit 15 may acquire the state information on the basis of information from an input mouse (not illustrated) which is operated by the hand of the operator. Further, the state acquisition unit 15 may acquire the state information by recognizing a sound which is obtained from a microphone (not illustrated).

The transmission unit 16 transmits the state information on the specific region of the operator which is acquired by the state acquisition unit 15 to the display-side device 20 along with the 3D position information on the specific region of the operator.

<Display-Side Device>

Figure 12:
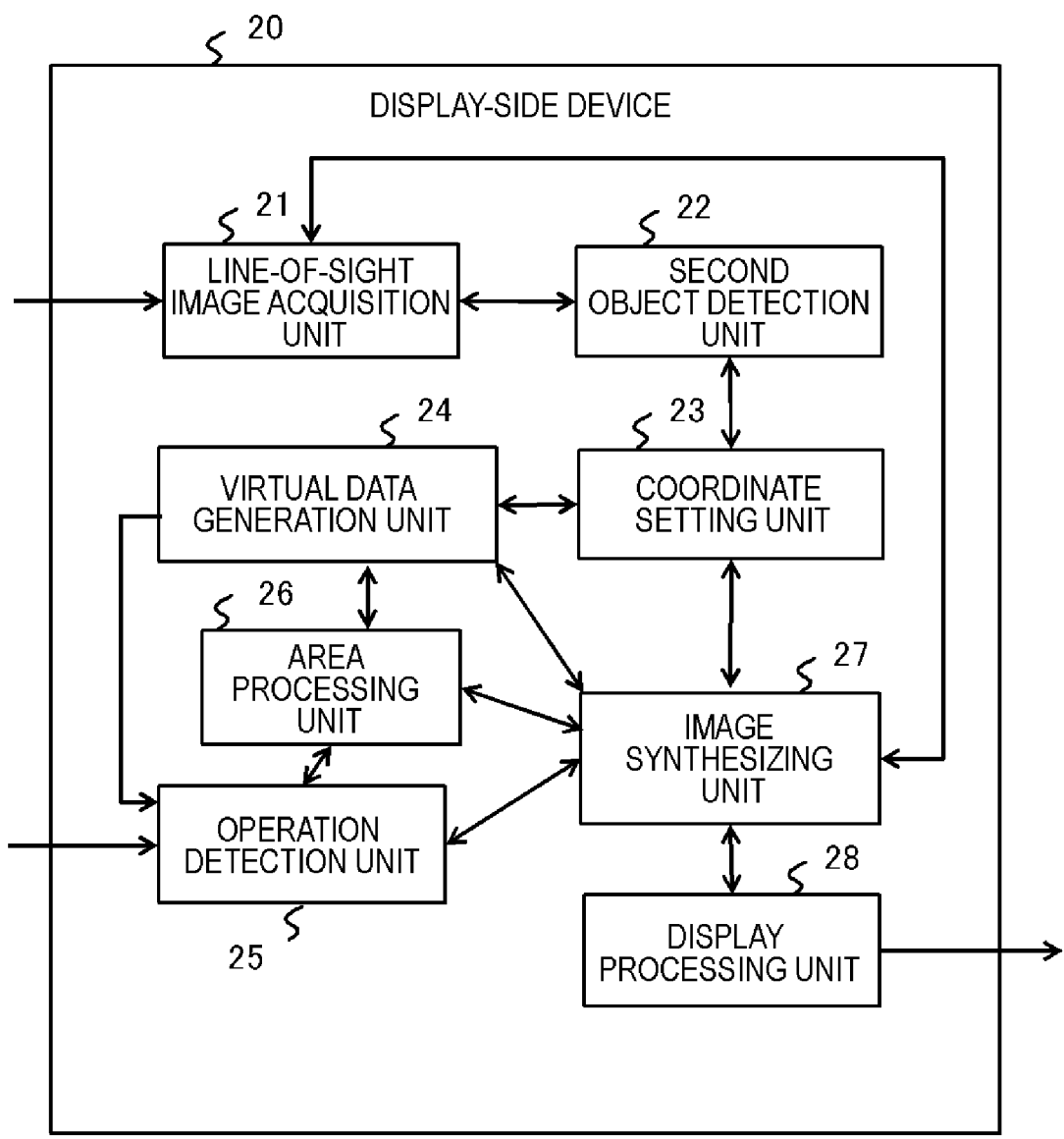
FIG. 12 is a diagram conceptually illustrating a processing configuration example of a display-side device according to the second exemplary embodiment.

FIG. 12 is a diagram conceptually illustrating a processing configuration example of the display-side device 20 according to the second exemplary embodiment. The display-side device 20 according to the second exemplary embodiment further includes an area processing unit 26 in addition to the configuration of the first exemplary embodiment. The area processing unit 26 is realized as with the other unit.

The operation detection unit 25 receives the 3D position information and the state information on the specific region of the operator which are transmitted from the sensor-side device 10, and detects the specific operation to the virtual 3D operation area itself on the basis of these information. The operation detection unit 25 may dispose a margin for detecting the specific operation with respect to the virtual 3D operation area itself in a predetermined range around the virtual 3D operation area in addition to the virtual 3D operation area. Hereinafter, an area for detecting the specific operation to the virtual 3D operation area itself will be referred to as a specific operation detection area.

The operation detection unit 25 determines whether to detect the specific operation to the virtual 3D operation area itself, or whether to detect the operation in the virtual 3D operation area described in the first exemplary embodiment on the basis of the detention period of the specific region of the operator in the specific operation detection area or the state of the specific region. For example, when the operation detection unit 25 detects that the specific region of the operator is maintained in the specific operation detection area for greater than or equal to a predetermined period of time, the operation detection unit 25 proceeds to the detection mode of the specific operation to the virtual 3D operation area itself. In addition, when the operation detection unit 25 detects that the specific region of the operator in the specific operation detection area is in a specific state (the clenching state), the operation detection unit 25 proceeds to the detection mode of the specific operation to the virtual 3D operation area itself. When the operation detection unit 25 proceeds to the detection mode of the specific operation to the virtual 3D operation area itself, specifically, the operation detection unit 25 detects the specific operation as follows. However, the specific operation to the virtual 3D operation area itself which is detected by the operation detection unit 25 is not limited to the following contents.

When the specific region of the operator is one hand, the operation detection unit 25 detects the following specific operation. The operation detection unit 25 detects an operation (hereinafter, referred to as a first specific operation) in which the one hand is moved in the specific operation detection area while maintaining a specific state (for example, the clenching state). In this case, the operation detection unit 25 acquires, as the operation information, a linear movement amount and a movement direction of the one hand while the first specific operation is detected. In addition, the operation detection unit 25 detects an operation (hereinafter, referred to as a second specific operation) in which the distance from a specific point in the virtual 3D operation area to the one hand is not changed before and after the movement of the one hand while the one hand maintains a specific state. Here, the specific point in the virtual 3D operation area, for example, is the center point. In this case, the operation detection unit 25 acquires, as the operation information, a solid angle change amount of a line connecting the one hand and the specific point while the second specific operation is detected.

When plural specific regions of the operator are both hands, the operation detection unit 25 detects the following specific operation. The operation detection unit 25 detects an operation (hereinafter, referred to as a third specific operation) in which a distance between the both hands is changed while the both hands maintain a specific state (for example, the clenching state). In this case, the operation detection unit 25 acquires, as the operation information, a change amount of the distance between the both hands while the third specific operation is detected. In addition, the operation detection unit 25 detects an operation (hereinafter, referred to as a fourth specific operation) in which an angle of a line connecting the both hands is changed while the both hands maintain a specific state (for example, the clenching state). In this case, the operation detection unit 25 acquires, as the operation information, a solid angle change amount of the line connecting the both hands while the fourth specific operation is detected.

In addition, when plural operation pointers are displayed in the virtual 3D operation area, the operation detection unit 25 detects an operation (hereinafter, referred to as a fifth specific operation) in which the specific region of the operator is moved in an area of the operation pointer while maintaining a specific state (for example, the clenching state). In this case, the operation detection unit 25 acquires, as the operation information, a linear movement amount and a movement direction of the specific region while the fifth specific operation is detected.

The area processing unit 26 applies at least one of resizing processing, rotation processing, modification processing, and movement processing corresponding to the operation which is detected by the operation detection unit 25 to the 3D area data generated by the virtual data generation unit 24. Specifically, the area processing unit 26 performs the following processing with respect to the 3D area data. However, the processing contents of the area processing unit 26 are not limited to the following specific example.

When the first specific operation is detected by the operation detection unit 25, the area processing unit 26 moves the virtual 3D operation area as the target by a linear movement amount and in a movement direction on the basis of the linear movement amount and the movement direction indicated by the operation information. In addition, when the second specific operation is detected, the area processing unit 26 rotates the virtual 3D operation area as the target by the solid angle change amount which is indicated by the operation information using the specific point as a reference. When the third specific operation is detected, the area processing unit 26 changes the size of the virtual 3D operation area as the target at a magnification rate or a diminution rate corresponding to the change amount of the distance between the both hands, which is indicated by the operation information. In addition, when the fourth specific operation is detected, the area processing unit 26 rotates the virtual 3D operation area as the target by the solid angle change amount of the line connecting the both hands using the position of the one hand as a reference point.

In addition, when moving to the detection mode of the specific operation with respect to the virtual 3D operation area itself, the area processing unit 26 sets a predetermined number of operation pointers in a predetermined position of the virtual 3D operation area. The operation pointer, for example, is displayed as in reference numerals OP1 and OP2 of FIG. 7B. When the virtual 3D operation area is set in the shape of a parallelepiped rectangle and a cube, the area processing unit 26 may set the operation pointer on each vertex. In addition, when the virtual 3D operation area is set in the DORAYAKI-like shape, as illustrated in FIG. 9, the area processing unit 26 may set the operation pointer on the start point and the end point.

When the fifth specific operation is detected, the area processing unit 26 moves the operation pointer which is operated by the linear movement amount and in the movement direction which are indicated by operation information, and thus modifies the virtual 3D operation area. For example, the DORAYAKI-type virtual 3D operation area is modified into a DORAYAKI-like shape which is generated on the principle illustrated in FIG. 9 according to the change in the distance between the start point and the end point due to the movement of the operation pointer. In addition, the virtual 3D operation area in the shape of a cube or a parallelepiped rectangle is modified in a state in which a distance relationship between the operation pointers is maintained.

Operation Example

Figure 13:
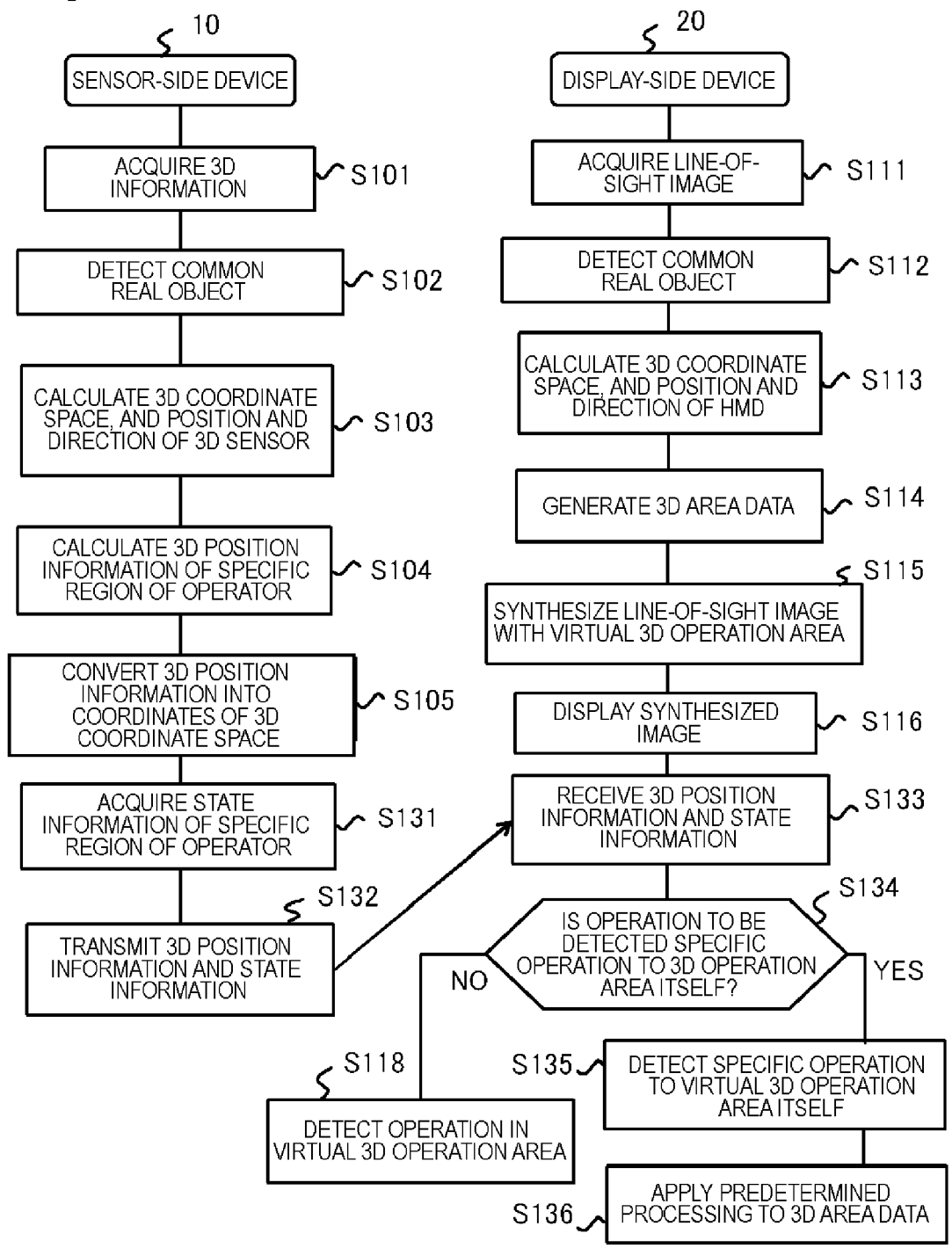
FIG. 13 is a sequence chart illustrating an operation example of a three-dimensional user interface system according to the second exemplary embodiment.

Hereinafter, a three-dimensional operation processing method according to the second exemplary embodiment will be described with reference to FIG. 13. FIG. 13 is a sequence chart of an operation example of the system 1 according to the second exemplary embodiment. In FIG. 13, the same reference numerals as those of FIG. 10 are applied to the steps of the same contents as those of FIG. 10. Hereinafter, the sensor-side device 10 or the display-side device 20 will be described as an execution subject of each method, and the execution subject may be at least one computer configuring the system 1.

The sensor-side device 10 executes (S101) to (S105) as with the first exemplary embodiment, and in the second exemplary embodiment, further acquires the state information of the specific region of the operator (S131). The sensor-side device 10 transmits the 3D position information and the state information on the specific region of the operator to the display-side device 20 (S132). Furthermore, the execution timing of (S131) is limited to the timing illustrated in FIG. 13.

The display-side device 20 executes (S111) to (S116) as with the first exemplary embodiment, and thus causes the HMD 9 to display the synthesized image of the line-of-sight image and the virtual 3D operation area. When the display-side device 20 receives the 3D position information and the state information on the specific region of the operator from the sensor-side device 10 (S133), the display-side device 20 determines whether or not the operation to be detected is the specific operation with respect to the virtual 3D operation area itself on the basis of these information (S134). As described above, this determination is performed on the basis of the detention period of the specific region of the operator or the state of the specific region in the specific operation detection area.

When the display-side device 20 determines that the operation to be detected is not the specific operation with respect to the virtual 3D operation area itself (S134; NO), as with the first exemplary embodiment, the operation in the virtual 3D operation area is detected (S118).

In contrast, when the display-side device 20 determines that the operation to be detected is the specific operation with respect to the virtual 3D operation area itself (S134; YES), the specific operation with respect to the virtual 3D operation area itself is detected on the basis of the 3D position information and the state information on the specific region of the operator (S135). The display-side device 20 applies at least one of resizing processing, rotation processing, modification processing, and movement processing corresponding to the detected specific operation to the 3D area data (S136). As a result thereof, the display-side device 20 causes the HMD 9 to display the synthesized image of the visible image and the virtual 3D operation area after at least one of the resizing, the rotation, the modification, and the movement is applied.

[Action and Effect of Second Exemplary Embodiment]

As described above, in the second exemplary embodiment, the state information of the specific region is acquired along with the 3D position information of the specific region of the operator, and it is determined whether or not the specific operation is performed with respect to the virtual 3D operation area itself on the basis of the 3D position and the state of the specific region. Then, when the specific operation is detected, at least one of resizing processing, rotation processing, modification processing, and movement processing corresponding to the specific operation is applied to the 3D area data, and as a result thereof, the virtual 3D operation area itself in the 3D coordinate space is operated.

Thus, according to the second exemplary embodiment, it is possible to design the shape and the position of the virtual 3D operation area such that the operator easily manages the virtual 3D operation area and a user interface provider desires to design the virtual 3D operation area. Further, according to the second exemplary embodiment, it is possible to realize the operation with respect to the virtual 3D operation area itself which is displayed as if the virtual 3D operation area is in the actual world with the same feeling as that of dealing with an actual object.

Third Exemplary Embodiment

The system 1 according to a third exemplary embodiment is able to renew the setting of the virtual 3D operation area. Hereinafter, the system 1 according to the third exemplary embodiment will be described on the basis of the contents different from that of the first exemplary embodiment and the second exemplary embodiment. In the following description, the same contents as those of the first exemplary embodiment and the second exemplary embodiment will not be repeated.

In the third exemplary embodiment, the sensor-side device 10 and the display-side device 20 has the same processing configuration as that of the first exemplary embodiment or the second exemplary embodiment. Hereinafter, only each unit of the processing contents different from that of the first exemplary embodiment will be described.

The virtual data generation unit 24 further generates display data of a function menu which is arranged in the 3D coordinate space and indicates plural shapes to be taken by the virtual 3D operation area. As the shape presented in the function menu, for example, as illustrated in FIG. 7A and FIG. 7B, the shape of a sphere, a cube, a parallelepiped rectangle, a DORAYAKI, and the like are included. However, in this exemplary embodiment, the specific shape itself presented in the function menu is not limited.

When a selection operation of any one shape presented in the function menu is detected by the operation detection unit 25, the virtual data generation unit 24 generates the 3D area data in which the virtual 3D operation area is arranged in a position in the 3D coordinate space which is determined according to the detected position of the operation to the function menu. When a DORAYAKI-like shape illustrated in FIG. 7B is selected, specifically, the 3D area data is generated as follows. The virtual data generation unit 24 sets the start point (an operation point OP1) and the end point (an operation point OP2) in positions in the 3D coordinate space, which are determined according to the detected position of the operation to the function menu, and sets a new virtual 3D operation area having a shape (DORAYAKI-like) of an area, where two spherical bodies intersect, the two spherical bodies having the start point and the end point as each center point and each having a spherical surface including a point to which a distance from the center point is half of a straight line connecting the start point and the end point.

Figure 14:
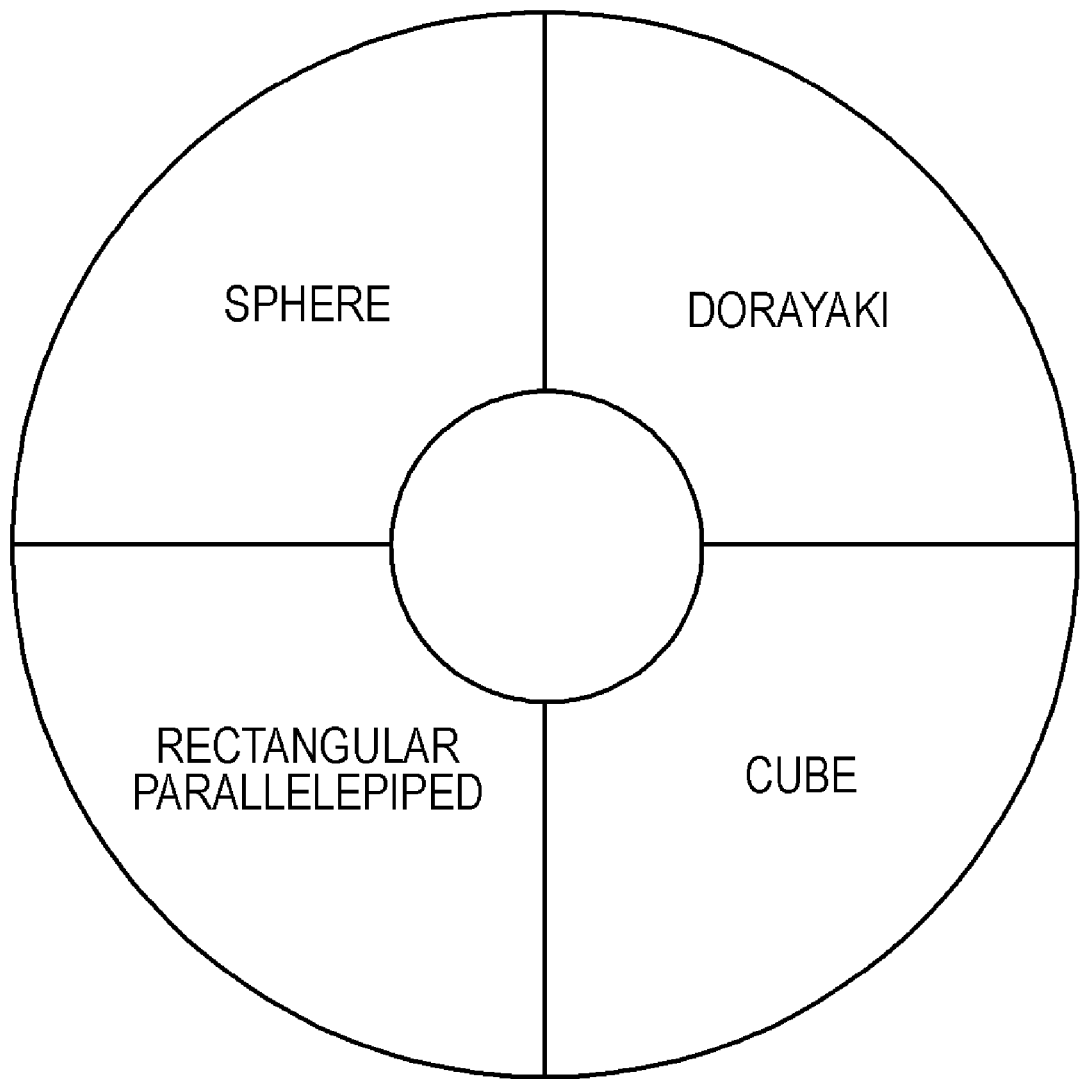
FIG. 14 is a diagram illustrating a display example of a function menu.

The image synthesizing unit 27 synthesizes the function menu with the line-of-sight image on the basis of the display data of the function menu. The display processing unit 28 further causes the HMD 9 to display the function menu on the basis of the synthesized image generated by the image synthesizing unit 27. FIG. 14 is a diagram illustrating a display example of the function menu. As illustrated in FIG. 14, the function menu shows each shape to be selectable.

The operation detection unit 25 detects the operation performed by the operator with the specific region to the function menu to cause the virtual data generation unit 24 to generate new three-dimensional area data representing the virtual 3D operation area which is arranged in a position in a 3D space determined according to the detected position of the operation and has a shape selected by the operation. In addition, the operation detection unit 25 detects a predetermined operation in an arbitrary position in the 3D coordinate space to cause the virtual data generation unit 24 to generate the display data of the function menu. The virtual data generation unit 24 may detect the operation of displaying the function menu and the selection operation to the function menu by using the 3D position information of the specific region of the operator, or may detect the 3D position information and the state information of the specific region as in the second exemplary embodiment.

Operation Example

Figure 15:
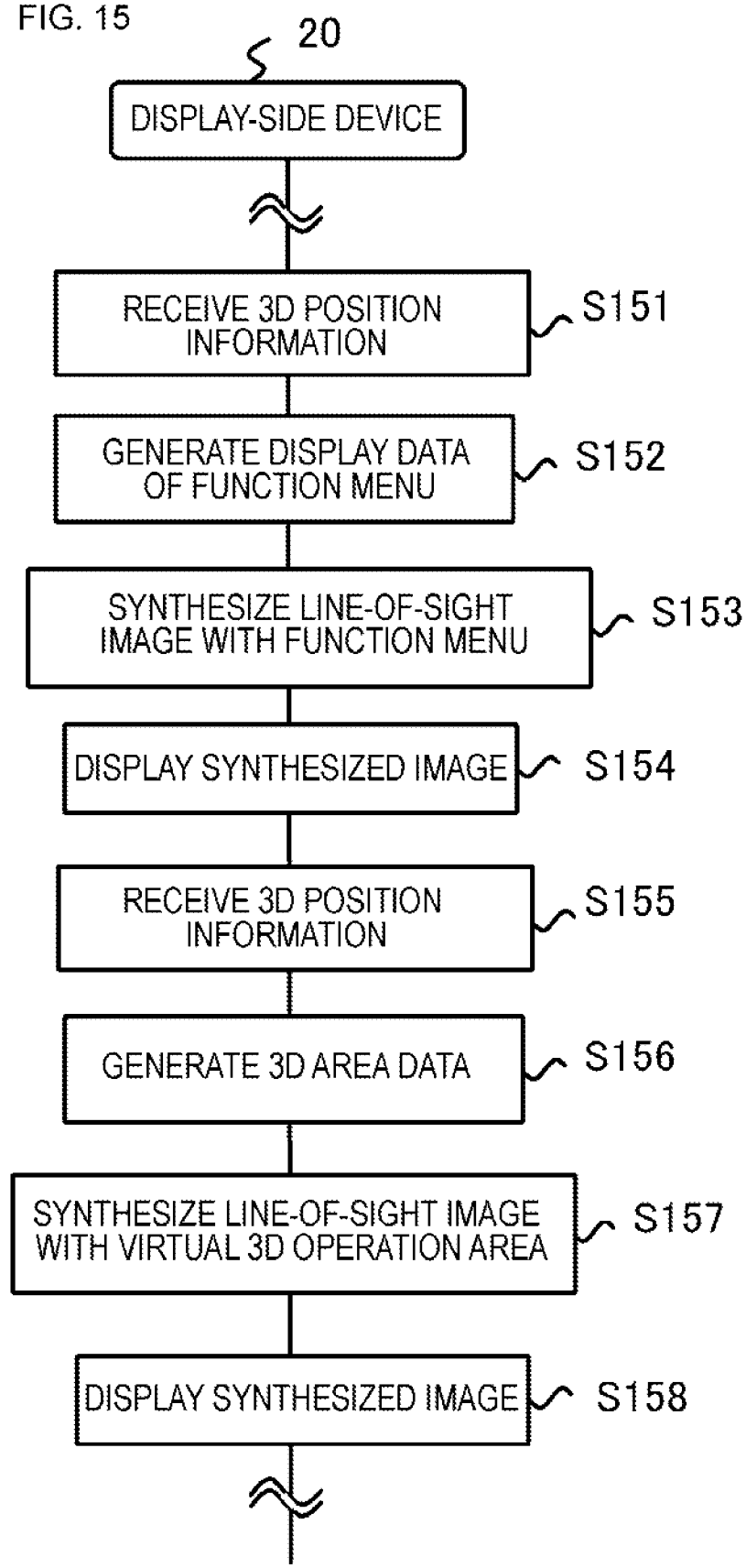
FIG. 15 is a flowchart illustrating an operation example of a display-side device according to a third exemplary embodiment.

Hereinafter, a three-dimensional operation processing method according to the third exemplary embodiment will be described with reference to FIG. 15. FIG. 15 is a flowchart illustrating an operation example of the display-side device 20 according to the third exemplary embodiment. In FIG. 15, only steps relevant to the third exemplary embodiment are illustrated, and the display-side device 20 actually executes the steps described in the first exemplary embodiment and the second exemplary embodiment in addition to the steps illustrated in FIG. 15. Hereinafter, the display-side device 20 will be described as an execution subject of each method, and the execution subject may be at least one computer configuring the system 1.

The display-side device 20 receives the 3D position information on the specific region of the operator from sensor-side device 10 (S151). At this time, it is assumed that in the HMD 9, only the line-of-sight image is displayed, and the virtual 3D operation area is not displayed.

When the display-side device 20 detects a predetermined operation on the basis of the 3D position information which is received in (S151), the display-side device 20 generates the display data of the function menu (S152). Then, the display-side device 20 synthesizes the line-of-sight image with the function menu on the basis of the display data (S153), and causes the HMD 9 to display the synthesized image (S154).

The operator operates the function menu displayed as illustrated in FIG. 14 by using the specific region. According to the example of FIG. 14, the operator points an area showing a desired shape (for example, a DORAYAKI-like shape) with a specific region. Accordingly, the display-side device 20 receives the 3D position information on the specific region of the operator corresponding to the operation to the function menu from the sensor-side device 10 (S155).

The display-side device 20 specifies the selection operation to the function menu on the basis of the 3D position information, and generates the 3D area data representing the virtual 3D operation area having a selected shape (S156). According to the example described above, the display-side device 20 generates the 3D area data representing the DORAYAKI-type virtual 3D operation area.

The display-side device 20 synthesizes the virtual 3D operation area represented by the generated 3D area data with the line-of-sight image (S157), and causes the HMD 9 to display the synthesized image (S158). Accordingly, the virtual 3D operation area having a shape selected by the operator is visible by the operator.

[Action and Effect of Third Exemplary Embodiment]

As described above, in the third exemplary embodiment, an image in which the function menu is synthesized with the line-of-sight image is displayed on the HMD 9 on the basis of the display data of the function menu, the 3D area data representing the virtual 3D operation area which has a shape selected in the function menu is newly generated. In this 3D area data, the virtual 3D operation area is arranged in the position in the 3D coordinate space which is determined according to the detected position of the operation to the function menu. As a result there of, an image in which the new virtual 3D operation area is synthesized with the line-of-sight image is displayed on the HMD 9.

Thus, according to the third exemplary embodiment, the operator is able to set the virtual 3D operation area having a desired shape in a desired position. Further, according to the third exemplary embodiment, it is possible for the operator to set the virtual 3D operation area by using a simple operation of operating the function menu which is displayed as virtual reality.

Modification Example

In each of the exemplary embodiments described above, as illustrated in FIG. 3, the HMD 9 includes the wearable cameras 9a and 9b and the displays 9c and 9d corresponding to both eyes of the operator (the user), but may include one wearable camera and one display. In this case, the one display may be arranged to cover the visual field of one eye of the operator, or may be arranged to cover the visual field of the both eyes of the operator. In this case, the virtual data generation unit 24 of the display-side device 20 may generate the virtual 3D object data using a known 3D CG technology such that a display object included in the virtual 3D space is able to be displayed by 3D CG.

In addition, in each of the exemplary embodiments described above, the video see-through type HMD 9 is used in order to obtain line-of-sight image, and an optical see-through type HMD 9 may be used. In this case, the displays 9c and 9d which have half mirrors may be disposed in the HMD 9, and a virtual 3D object may be displayed on these displays 9c and 9d. However, in this case, the camera for obtaining the image for detecting the common real object in the line-of-sight direction of the operator is disposed in a position which does not shield the visual field of the operator of the HMD 9.

In addition, in each of the exemplary embodiments described above, as illustrated in FIG. 2, the sensor-side device 10 and the display-side device 20 are separately disposed, but may be configured by one computer (a device). In this case, the HMD 9 and the 3D sensor 8 are connected to the input-output I/F 5 of this computer, and thus the transmission unit 16 is not necessary.

In addition, in the second exemplary embodiment described above, it is determined that the specific operation to the virtual 3D operation area itself moves to the detection mode by using the 3D position information and the state information on the specific region of the operator, and the specific operation is detected, but only the 3D position information may be used. In this case, the state acquisition unit 15 of the sensor-side device 10 is not necessary.

In addition, in the third exemplary embodiment described above, the function menu for renewing the setting of the virtual 3D operation area is displayed, but the function menu may be displayed in order to change the shape with respect to the virtual 3D operation area which is set in advance. In this case, the operation detection unit 25 detects a predetermined operation to the virtual 3D operation area which exists in advance, and the virtual data generation unit 24 generates the display data of the function menu according to the detection of the predetermined operation. Then, the area processing unit 26 processes the 3D area data such that the virtual 3D operation area as the target is changed to have a shape selected in the function menu.

Figure 16:
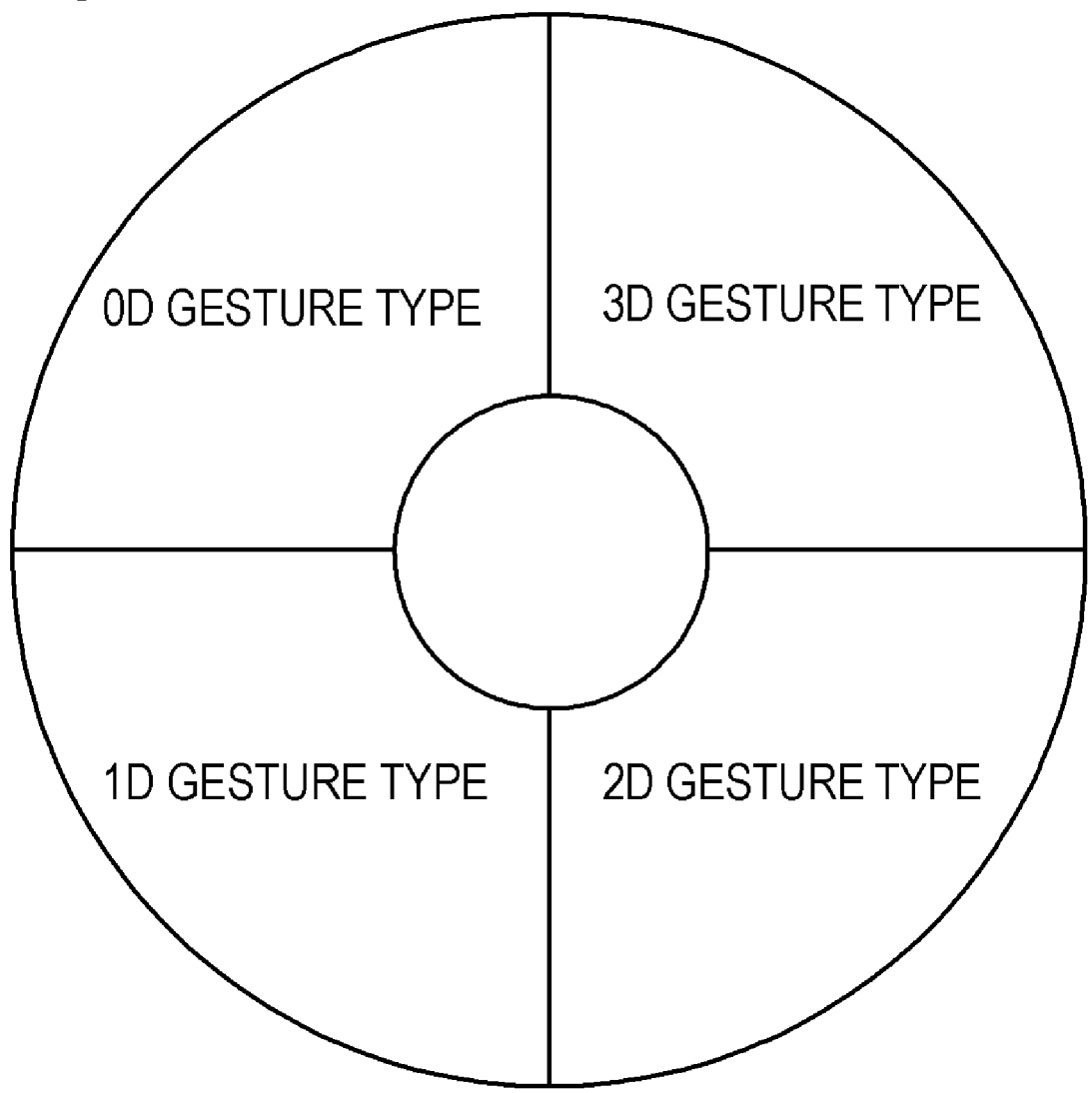
FIG. 16 is a diagram illustrating another display example of the function menu.

Further, the function menu may be displayed in order to indicate the operation type with respect to the virtual 3D operation area. In this case, the virtual data generation unit 24 generates the display data of the function menu presenting a plurality of operation types which is able to be set in the virtual 3D operation area, as illustrated in FIG. 16. FIG. 16 is a diagram illustrating another display example of the function menu. According to the example of FIG. 16, the function menu is displayed such that any one of the 3D gesture type, 2D gesture type, 1D gesture type, and 0D gesture type is selected. In this case, the operation detection unit 25 may specify any one operation type selected from the function menu, and the virtual data generation unit 24 or the area processing unit 26 may set the specified operation type in the virtual 3D operation area as the target.

Furthermore, in the flowcharts used in the above description, plural steps (processings) are sequentially described, but the execution sequence of the steps which are executed in each of the exemplary embodiments is not limited to the sequence described above. In each of the exemplary embodiments, the sequence of the illustrated steps is able to be changed within a range of not interrupting the contents. In addition, each of the exemplary embodiments and the modification example described above are able to be combined within a range of not conflicting with the contents.

A part of or all of each of the exemplary embodiments and the modification example is able to be specified as in the following appendices. However, each of the exemplary embodiments and the modification example are not limited to the following description.

(Appendix 1)

A three-dimensional user interface device, including: a line-of-sight image acquisition unit that acquires a line-of-sight image from an operator, which is captured by an image capturing unit mounted on a head of the operator; a coordinate setting unit that sets a three-dimensional coordinate space on the basis of the line-of-sight image which is acquired by the line-of-sight image acquisition unit; a virtual data generation unit that generates three-dimensional area data representing a transparent virtual three-dimensional operation area arranged in an arbitrary position in the three-dimensional coordinate space in a state in which at least a boundary of the area is visible; a display processing unit that causes a display unit mounted on the head of the operator to display the virtual three-dimensional operation area represented by the three-dimensional area data which is generated by the virtual data generation unit by using a visible space in the three-dimensional coordinate space corresponding to a space shown on the line-of-sight image as a display reference; a position acquisition unit that acquires a three-dimensional position of a specific region of the operator in the three-dimensional coordinate space; and an operation detection unit that detects an operation performed by the operator with the specific region in the virtual three-dimensional operation area on the basis of the three-dimensional position which is acquired by the position acquisition unit and a position of the virtual three-dimensional operation area in the three-dimensional coordinate space.

(Appendix 2)

The three-dimensional user interface device according to Appendix 1, further including: an area processing unit that applies at least one of resizing processing, rotation processing, modification processing, and movement processing corresponding to a specific operation which is detected by the operation detection unit to the three-dimensional area data, when the operation detection unit detects the specific operation to the virtual three-dimensional operation area itself.

(Appendix 3)

The three-dimensional user interface device according to Appendix 1 or 2, in which the virtual data generation unit generates a plurality of the three-dimensional area data respectively representing a position in the three-dimensional coordinate space and an operation type with respect to each of a plurality of the virtual three-dimensional operation areas, and the operation detection unit specifies a virtual three-dimensional operation area which is operated among the plurality of virtual three-dimensional operation areas, and acquires operation information corresponding to an operation type which is set in the specified virtual three-dimensional operation area.

(Appendix 4)

The three-dimensional user interface device according to any one of Appendices 1 to 3, in which the virtual data generation unit further generates display data of a function menu arranged in the three-dimensional coordinate space, the function menu representing a plurality of shapes to be taken by the virtual three-dimensional operation area, the display processing unit causes the display unit further to display the function menu, and the operation detection unit detects an operation performed by the operator with the specific region to the function menu to cause the virtual data generation unit to generate the three-dimensional area data representing the virtual three-dimensional operation area which is arranged in a position in the three-dimensional space, the position determined according to a detected position of the operation and which has a shape selected by the operation.

(Appendix 5)

The three-dimensional user interface device according to Appendix 4, in which the virtual data generation unit sets a start point and an end point in a position in the three-dimensional coordinate space which is determined according to the detected position of the operation to the function menu and sets a shape of an area in which two spherical bodies intersect, to the virtual three-dimensional operation area which is indicated by new three-dimensional area data, the two spherical bodies having the start point and the end point as each center point and each having a spherical surface including a point to which a distance from the center point is half of a straight line connecting the start point and the end point.

(Appendix 6)

The three-dimensional user interface device according to any one of Appendices 1 to 5, further including: an image synthesizing unit that synthesizes the virtual three-dimensional operation area represented by the three-dimensional area data with the line-of-sight image showing the space which is the display reference on the basis of the three-dimensional coordinate space, in which the display processing unit causes the display unit to display an image obtained by the image synthesizing unit.

(Appendix 7)

The three-dimensional user interface device according to Appendix 6, further including: a three-dimensional information acquisition unit that acquires three-dimensional information from a three-dimensional sensor; a first object detection unit that detects a known common real object from the three-dimensional information; a second object detection unit that detects the common real object from the line-of-sight image which is acquired by the line-of-sight image acquisition unit; and a reference setting unit that sets the three-dimensional coordinate space on the basis of the common real object which is detected by the first object detection unit and that calculates a position and a direction of the three-dimensional sensor, in which the coordinate setting unit shares the three-dimensional coordinate space on the basis of the common real object which is detected by the second object detection unit and calculates a position and a direction of the image capturing unit, the position acquisition unit converts three-dimensional position information of the specific region of the operator, which is obtained from the three-dimensional information acquired by the three-dimensional information acquisition unit, on the basis of the position and the direction of the three-dimensional sensor which are calculated by the reference setting unit and the three-dimensional coordinate space to calculate the three-dimensional position information of the specific region of the operator in the three-dimensional coordinate space, and the image synthesizing unit performs the synthesizing on the basis of the position and the direction of the image capturing unit which are calculated by the coordinate setting unit and the three-dimensional coordinate space.

(Appendix 8)

A three-dimensional operation processing method executed by at least one computer, including: acquiring a line-of-sight image from an operator, the line-of-sight image being captured by an image capturing unit mounted on a head of the operator; setting a three-dimensional coordinate space on the basis of the acquired line-of-sight image; generating three-dimensional area data representing a transparent virtual three-dimensional operation area arranged in an arbitrary position in the three-dimensional coordinate space in a state in which at least a boundary of the virtual three-dimensional operation area is visible; causing a display unit mounted on the head of the operator to display the virtual three-dimensional operation area represented by the generated three-dimensional area data by using a visible space in the three-dimensional coordinate space corresponding to a space shown on the line-of-sight image as a display reference; acquiring a three-dimensional position of a specific region of the operator in the three-dimensional coordinate space; and detecting an operation performed by the operator with the specific region in the virtual three-dimensional operation area on the basis of the acquired three-dimensional position and a position of the virtual three-dimensional operation area in the three-dimensional coordinate space.

(Appendix 9)

The three-dimensional operation processing method according to Appendix 8, further including: detecting a specific operation of the operator to the virtual three-dimensional operation area itself; and applying at least one of resizing processing, rotation processing, modification processing, and movement processing corresponding to the detected specific operation to the three-dimensional area data.

(Appendix 10)

The three-dimensional operation processing method according to Appendix 8 or 9, in which said generating the three-dimensional area data includes generating a plurality of the three-dimensional area data respectively representing a position in the three-dimensional coordinate space and an operation type with respect to each of a plurality of the virtual three-dimensional operation areas, and said detecting the operation includes specifying a virtual three-dimensional operation area which is operated among the plurality of virtual three-dimensional operation areas and acquiring operation information corresponding to an operation type which is set in the specified virtual three-dimensional operation area.

(Appendix 11)

The three-dimensional operation processing method according to any one of Appendices 8 to 10, further including: generating display data of a function menu arranged in the three-dimensional coordinate space, the function menu representing a plurality of shapes taken by the virtual three-dimensional operation area; causing the display unit to display the function menu; and detecting an operation performed by the operator with the specific region to the function menu, in which said generating the three-dimensional area data includes generating the three-dimensional area data representing the virtual three-dimensional operation area which is arranged in a position in the three-dimensional space, the position determined according to a detected position of the operation to the function menu, and which has a shape selected by the operation.

(Appendix 12)

The three-dimensional operation processing method according to Appendix 11, in which said generating the three-dimensional area data includes setting a start point and an end point in a position in the three-dimensional coordinate space which is determined according to the detected position of the operation to the function menu and generating the three-dimensional area data representing the virtual three-dimensional operation area having a shape of an area, where two spherical bodies intersect, the two spherical bodies having the start point and the end point as each center point and each having a spherical surface including a point to which a distance from the center point is half of a straight line connecting the start point and the end point.

(Appendix 13)

The three-dimensional operation processing method according to any one of Appendices 8 to 12, further including: synthesizing the virtual three-dimensional operation area represented by the three-dimensional area data with the line-of-sight image showing the space which is the display reference on the basis of the three-dimensional coordinate space, in which said causing to display the virtual three-dimensional operation area includes causing the display unit to display an image obtained by the synthesizing.

(Appendix 14)

The three-dimensional operation processing method according to Appendix 13, further including: acquiring three-dimensional information from a three-dimensional sensor; detecting a known common real object from the three-dimensional information; detecting the common real object from the acquired line-of-sight image; setting the three-dimensional coordinate space on the basis of the detected common real object; calculating a position and a direction of the three-dimensional sensor; and calculating three-dimensional position information of the specific region of the operator in the three-dimensional coordinate space by converting the three-dimensional position information of the specific region of the operator, which is obtained from the three-dimensional information, on the basis of the position and the direction of the three-dimensional sensor and the three-dimensional coordinate space, in which said setting the three-dimensional coordinate space includes sharing the three-dimensional coordinate space on the basis of the common real object which is detected from the line-of-sight image and calculating a position and a direction of the image capturing unit, and said synthesizing the line-of-sight image with the virtual three-dimensional operation area is performed by using the position and the direction of the image capturing unit and the three-dimensional coordinate space.

(Appendix 15)

A program causing at least one computer to execute the three-dimensional operation processing method according to any one of Appendices 8 to 14.

This application claims priority on the basis of Japanese Patent Application No. 2013-047849, filed on Mar. 11, 2013, and the entire disclosure thereof is incorporated herein.

The invention claimed is:

1. A three-dimensional user interface device, comprising:
one or more processors configured to
acquire a line-of-sight image from an operator, the line-of-sight image being captured by an image capturing device mounted on a head of the operator,
set three-dimensional coordinate space on the basis of the acquired line-of-sight image, and
generate three-dimensional area data representing a transparent virtual three-dimensional operation area arranged in an arbitrary position in the three-dimensional coordinate space in a state in which at least a boundary of the virtual three-dimensional operation area is visible, and generate display data of a function menu arranged in the three-dimensional coordinate space, the function menu representing a plurality of shapes taken by the virtual three-dimensional operation area; and
a display processor that causes a display mounted on the head of the operator to display the virtual three-dimensional operation area represented by the three-dimensional area data which is generated by the one or more processors by using a visible space in the three-dimensional coordinate space corresponding to a space shown on the line-of-sight image as a display reference, and causes the display to display the function menu,
wherein the one or more processors are configured to
acquire a three-dimensional position of a specific region of the operator in the three-dimensional coordinate space,
detect an operation performed by the operator with the specific region in the virtual three-dimensional operation area on the basis of the three-dimensional position which is acquired by the one or more processors and a position of the virtual three-dimensional operation area in the three-dimensional coordinate space, and detect an operation performed by the operator with the specific region to the function menu to cause the three-dimensional area data representing the virtual three-dimensional operation area which is arranged in a position in the three-dimensional space to be generated, the position determined according to a detected position of the operation and which has a shape selected by the operation, and
set a start point and an end point in the position in the three-dimensional coordinate space which is determined according to the detected position of the operation to the function menu, and set a shape of an area, where two spherical bodies intersect, to the virtual three-dimensional operation area which is indicated by new three-dimensional area data, the two spherical bodies having the start point and the end point as each center point and each having a spherical surface including a point to which a distance from the center point is half of a straight line connecting the start point and the end point.

2. The three-dimensional user interface device according to claim 1, wherein the one or more processors are configured to apply at least one of resizing processing, rotation processing, modification processing, and movement processing corresponding to a specific operation which is detected by the one or more processors to the three-dimensional area data, when the one or more processors detect the specific operation to the virtual three-dimensional operation area itself.

3. The three-dimensional user interface device according to claim 2, wherein
the one or more processors generate a plurality of the three-dimensional area data respectively representing a position in the three-dimensional coordinate space and an operation type with respect to each of a plurality of the virtual three-dimensional operation areas, and
specify a virtual three-dimensional operation area which is operated among the plurality of virtual three-dimensional operation areas, and acquires operation information corresponding to an operation type which is set in the specified virtual three-dimensional operation area.

4. The three-dimensional user interface device according to claim 1, wherein
the one or more processors generate a plurality of the three-dimensional area data respectively representing a position in the three-dimensional coordinate space and an operation type with respect to each of a plurality of the virtual three-dimensional operation areas, and
specify a virtual three-dimensional operation area which is operated among the plurality of virtual three-dimensional operation areas, and acquires operation information corresponding to an operation type which is set in the specified virtual three-dimensional operation area.

5. The three-dimensional user interface device according to claim 1, wherein the one or more processors synthesize the virtual three-dimensional operation area represented by the three-dimensional area data with the line-of-sight image showing the space which is the display reference on the basis of the three-dimensional coordinate space,
wherein the display processor causes the display to display an image obtained by the one or more processors.

6. A three-dimensional operation processing method executed by at least one computer, the method comprising:
acquiring a line-of-sight image from an operator, the line-of-sight image being captured by an image capturing device mounted on a head of the operator;
setting a three-dimensional coordinate space on the basis of the acquired line-of-sight image;
generating three-dimensional area data representing a transparent virtual three-dimensional operation area arranged in an arbitrary position in the three-dimensional coordinate space in a state in which at least a boundary of the virtual three-dimensional operation area is visible;
causing a display mounted on the head of the operator to display the virtual three-dimensional operation area represented by the generated three-dimensional area data by using a visible space in the three-dimensional coordinate space corresponding to a space shown on the line-of-sight image as a display reference;
acquiring a three-dimensional position of a specific region of the operator in the three-dimensional coordinate space;
detecting an operation performed by the operator with the specific region in the virtual three-dimensional operation area on the basis of the acquired three-dimensional position and a position of the virtual three-dimensional operation area in the three-dimensional coordinate space;

generating display data of a function menu arranged in the three-dimensional coordinate space, the function menu representing a plurality of shapes taken by the virtual three-dimensional operation area;

causing the display to display the function menu; and detecting an operation performed by the operator with the specific region to the function menu, wherein said generating the three-dimensional area data includes generating the three-dimensional area data representing the virtual three-dimensional operation area which is arranged in a position in the three-dimensional space, the position determined according to a detected position of the operation to the function menu, and which has a shape selected by the operation, and said generating the three-dimensional area data includes setting a start point and an end point in the position in the three-dimensional coordinate space which is determined according to the detected position of the operation to the function menu and generating the three-dimensional area data representing the virtual three-dimensional operation area having a shape of an area, where two spherical bodies intersect, the two spherical bodies having the start point and the end point as each center point and each having a spherical surface including a point to which a distance from the center point is half of a straight line connecting the start point and the end point.

7. The three-dimensional operation processing method according to claim 6, further comprising:

detecting a specific operation of the operator to the virtual three-dimensional operation area itself; and applying at least one of resizing processing, rotation processing, modification processing, and movement processing corresponding to the detected specific operation to the three-dimensional area data.

8. The three-dimensional operation processing method according to claim 6, wherein said generating the three-dimensional area data includes generating a plurality of the three-dimensional area data respectively representing a position in the three-dimensional coordinate space and an operation type with respect to each of a plurality of the virtual three-dimensional operation areas, and said detecting the operation includes specifying a virtual three-dimensional operation area which is operated among the plurality of virtual three-dimensional operation areas and acquiring operation information corresponding to an operation type which is set in the specified virtual three-dimensional operation area.

9. The three-dimensional operation processing method according to claim 6, further comprising:

synthesizing the virtual three-dimensional operation area represented by the three-dimensional area data with the line-of-sight image showing the space which is the display reference on the basis of the three-dimensional coordinate space, wherein said causing displaying the virtual three-dimensional operation area includes causing the display to display an image obtained by the synthesizing.

10. A non-transitory computer-readable storage medium storing a program for causing at least one computer to execute a three-dimensional operation processing method, the method comprising:

acquiring a line-of-sight image from an operator, the line-of-sight image being captured by an image capturing device mounted on a head of the operator;

setting a three-dimensional coordinate space on the basis of the acquired line-of-sight image;

generating three-dimensional area data representing a transparent virtual three-dimensional operation area arranged in an arbitrary position in the three-dimensional coordinate space in a state in which at least a boundary of the virtual three-dimensional operation area is visible;

causing a display mounted on the head of the operator to display the virtual three-dimensional operation area represented by the generated three-dimensional area data by using a visible space in the three-dimensional coordinate space corresponding to a space shown on the line-of-sight image as a display reference;

acquiring a three-dimensional position of a specific region of the operator in the three-dimensional coordinate space;

detecting an operation performed by the operator with the specific region in the virtual three-dimensional operation area on the basis of the acquired three-dimensional position and a position of the virtual three-dimensional operation area in the three-dimensional coordinate space;

generating display data of a function menu arranged in the three-dimensional coordinate space, the function menu representing a plurality of shapes taken by the virtual three-dimensional operation area;

causing the display to display the function menu; and detecting an operation performed by the operator with the specific region to the function menu, wherein said generating the three-dimensional area data includes generating the three-dimensional area data representing the virtual three-dimensional operation area which is arranged in a position in the three-dimensional space, the position determined according to a detected position of the operation to the function menu, and which has a shape selected by the operation, and said generating the three-dimensional area data includes setting a start point and an end point in the position in the three-dimensional coordinate space which is determined according to the detected position of the operation to the function menu and generating the three-dimensional area data representing the virtual three-dimensional operation area having a shape of an area, where two spherical bodies intersect, the two spherical bodies having the start point and the end point as each center point and each having a spherical surface including a point to which a distance from the center point is half of a straight line connecting the start point and the end point.

11. The non-transitory computer-readable storage medium according to claim 10, further comprising:

detecting a specific operation of the operator to the virtual three-dimensional operation area itself; and applying at least one of resizing processing, rotation processing, modification processing, and movement processing corresponding to the detected specific operation to the three-dimensional area data.

12. The non-transitory computer-readable storage medium according to claim 10, wherein
said generating the three-dimensional area data includes generating a plurality of the three-dimensional area data respectively representing a position in the three-dimensional coordinate space and an operation type with respect to each of a plurality of the virtual three-dimensional operation areas, and
said detecting the operation includes specifying a virtual three-dimensional operation area which is operated among the plurality of virtual three-dimensional operation areas and acquiring operation information corresponding to an operation type which is set in the specified virtual three-dimensional operation area.

13. The non-transitory computer-readable storage medium according to claim 10, further comprising:
synthesizing the virtual three-dimensional operation area represented by the three-dimensional area data with the line-of-sight image showing the space which is the display reference on the basis of the three-dimensional coordinate space,
wherein said causing to display the virtual three-dimensional operation area includes causing the display to display an image obtained by the synthesizing.

* * * * *